US009930721B2

(12) United States Patent
Takano

(10) Patent No.: US 9,930,721 B2
(45) Date of Patent: Mar. 27, 2018

(54) RADIO COMMUNICATION DEVICE, BASE STATION, METHOD FOR RADIO COMMUNICATION, AND RADIO COMMUNICATION SYSTEM WITH ACYCLIC PAGING CYCLES

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/377,239

(22) Filed: Dec. 13, 2016

(65) Prior Publication Data

US 2017/0094712 A1 Mar. 30, 2017

Related U.S. Application Data

(63) Continuation of application No. 13/981,641, filed as application No. PCT/JP2012/052742 on Feb. 7, 2012, now Pat. No. 9,549,390.

(30) Foreign Application Priority Data

Feb. 16, 2011 (JP) ................................ 2011-030656

(51) Int. Cl.
*H04W 4/00* (2009.01)
*H04W 76/04* (2009.01)
*H04W 68/00* (2009.01)

(52) U.S. Cl.
CPC ......... *H04W 76/046* (2013.01); *H04W 4/005* (2013.01); *H04W 68/005* (2013.01)

(58) Field of Classification Search
CPC .. H04W 76/046; H04W 4/005; H04W 68/005
See application file for complete search history.

(56) References Cited

U.S. PATENT DOCUMENTS

| 8,060,133 | B1 | 11/2011 | Khanka et al. | |
|---|---|---|---|---|
| 8,842,643 | B1* | 9/2014 | Oroskar | H04W 68/005 370/336 |
| 2006/0089161 | A1* | 4/2006 | Kim | H04W 76/04 455/458 |
| 2006/0205444 | A1 | 9/2006 | Aerrabotu et al. | |
| 2008/0311932 | A1* | 12/2008 | Kuo | H04W 76/048 455/458 |
| 2009/0016474 | A1 | 1/2009 | Bertorelle | |

(Continued)

FOREIGN PATENT DOCUMENTS

| CN | 1842975 A | 10/2006 |
|---|---|---|
| JP | 09-083427 A | 3/1997 |
| JP | 2009-147484 A | 7/2009 |

OTHER PUBLICATIONS

Office Action for CN Patent Application No. 201280008281.4, dated Oct. 17, 2016, 10 pages of Office Action and 21 pages of English Translation.

*Primary Examiner* — Ajit Patel
(74) *Attorney, Agent, or Firm* — Chip Law Group

(57) ABSTRACT

Provided is a radio communication device including a radio communication section that communicates by radio with a base station, a storage section that stores information indicating two or more intervals, and a receipt control section that switches, among the two or more intervals, a receiving cycle for receiving a paging channel sent from the base station in an unconnected state with the base station.

14 Claims, 26 Drawing Sheets

(56) References Cited

U.S. PATENT DOCUMENTS

| | | | |
|---|---|---|---|
| 2009/0279517 A1* | 11/2009 | Chin | H04W 48/16 |
| | | | 370/338 |
| 2010/0002720 A1 | 1/2010 | Ji et al. | |
| 2010/0110963 A1 | 5/2010 | Huang et al. | |
| 2010/0137007 A1 | 6/2010 | Kojima | |
| 2010/0184458 A1 | 7/2010 | Fodor et al. | |
| 2010/0191370 A1 | 7/2010 | Barragan Trevino et al. | |
| 2010/0248768 A1 | 9/2010 | Nakatsugawa et al. | |
| 2010/0279676 A1 | 11/2010 | Benn et al. | |
| 2010/0317374 A1 | 12/2010 | Alpert et al. | |
| 2010/0323610 A1 | 12/2010 | Li et al. | |
| 2010/0331019 A1* | 12/2010 | Bhattacharjee | H04W 52/0229 |
| | | | 455/458 |
| 2011/0039536 A1 | 2/2011 | Lee et al. | |
| 2011/0269462 A1 | 11/2011 | Sagfors et al. | |
| 2012/0088501 A1* | 4/2012 | Chin | H04W 8/26 |
| | | | 455/433 |

\* cited by examiner

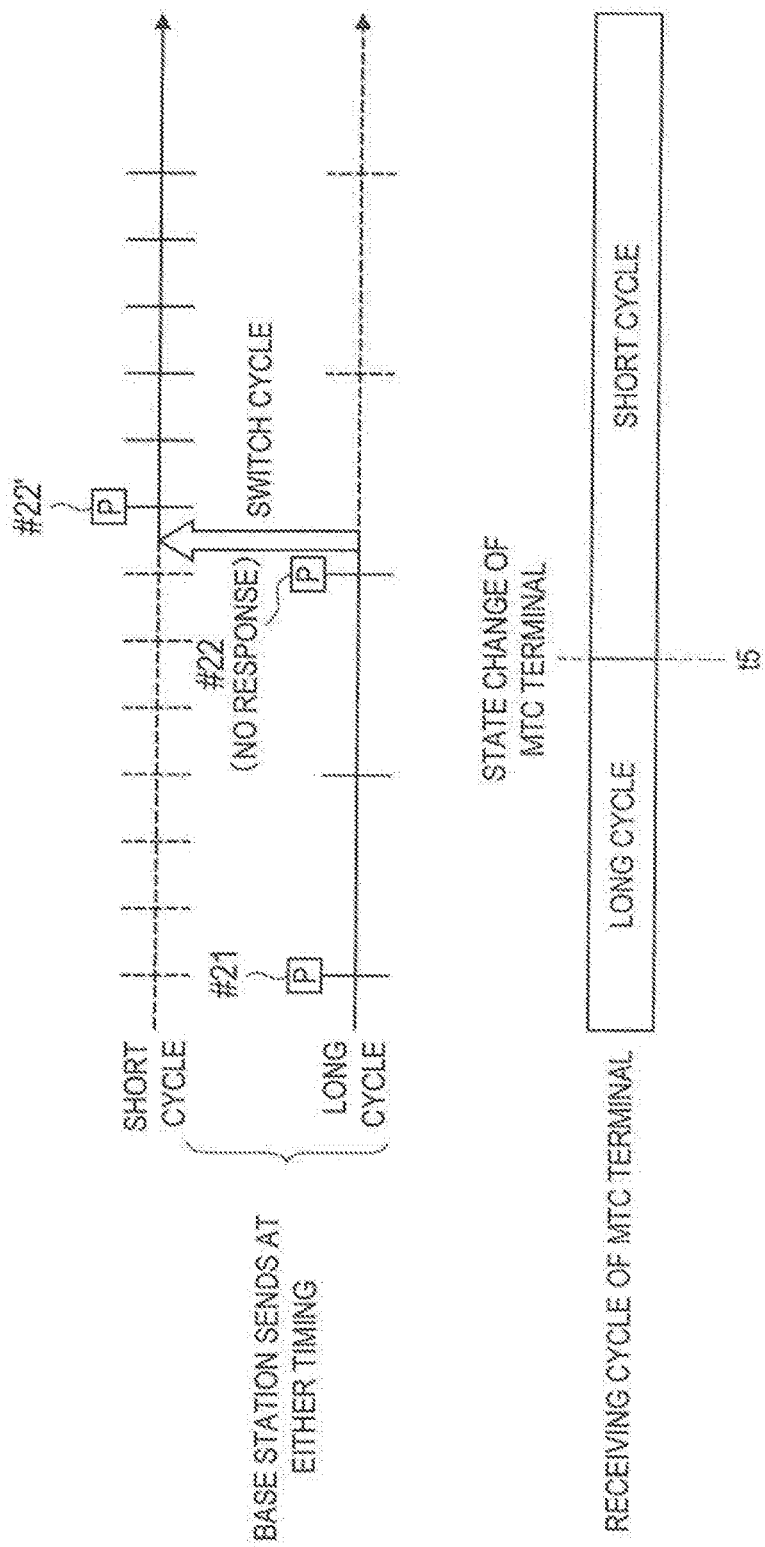

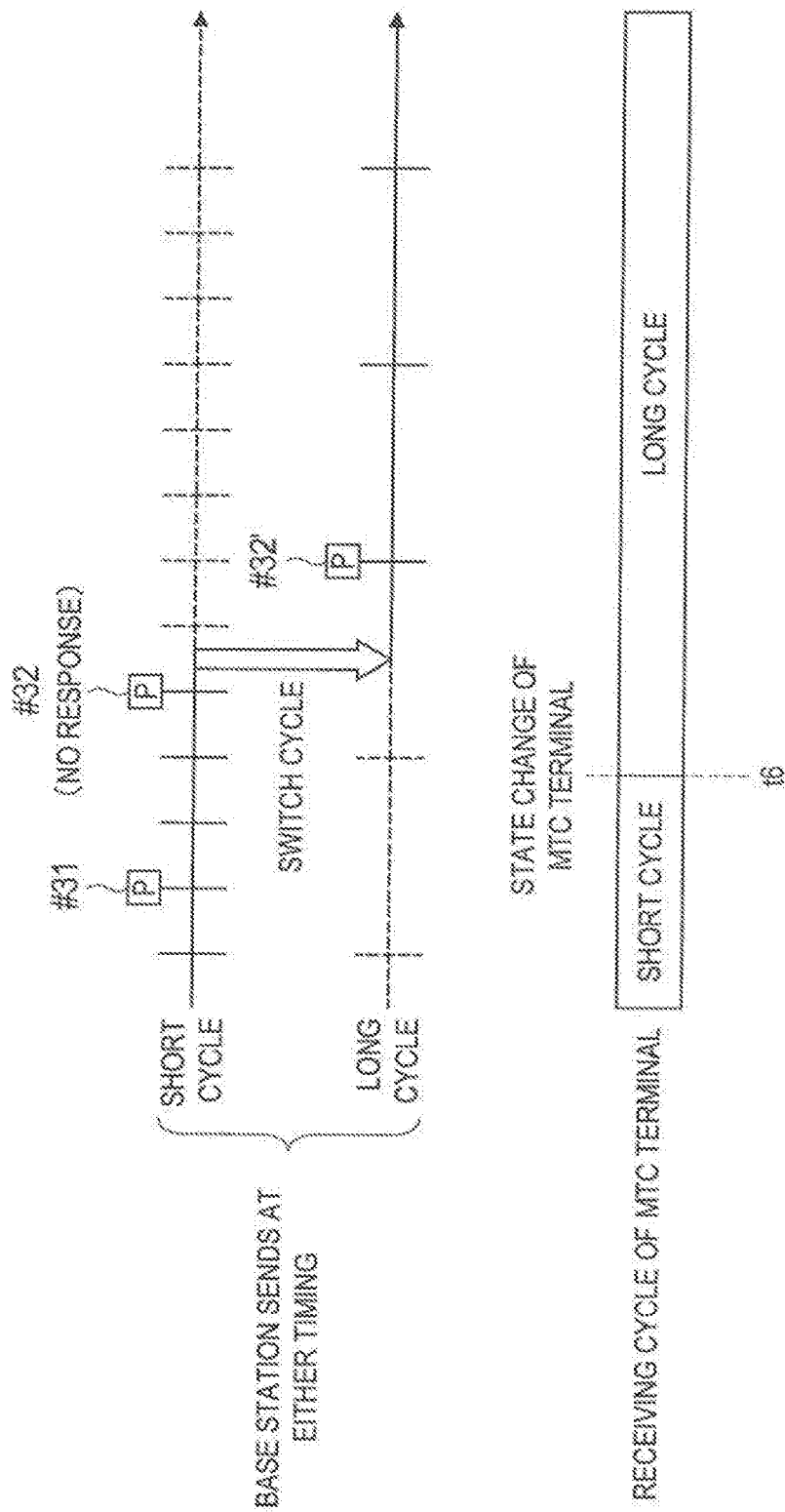

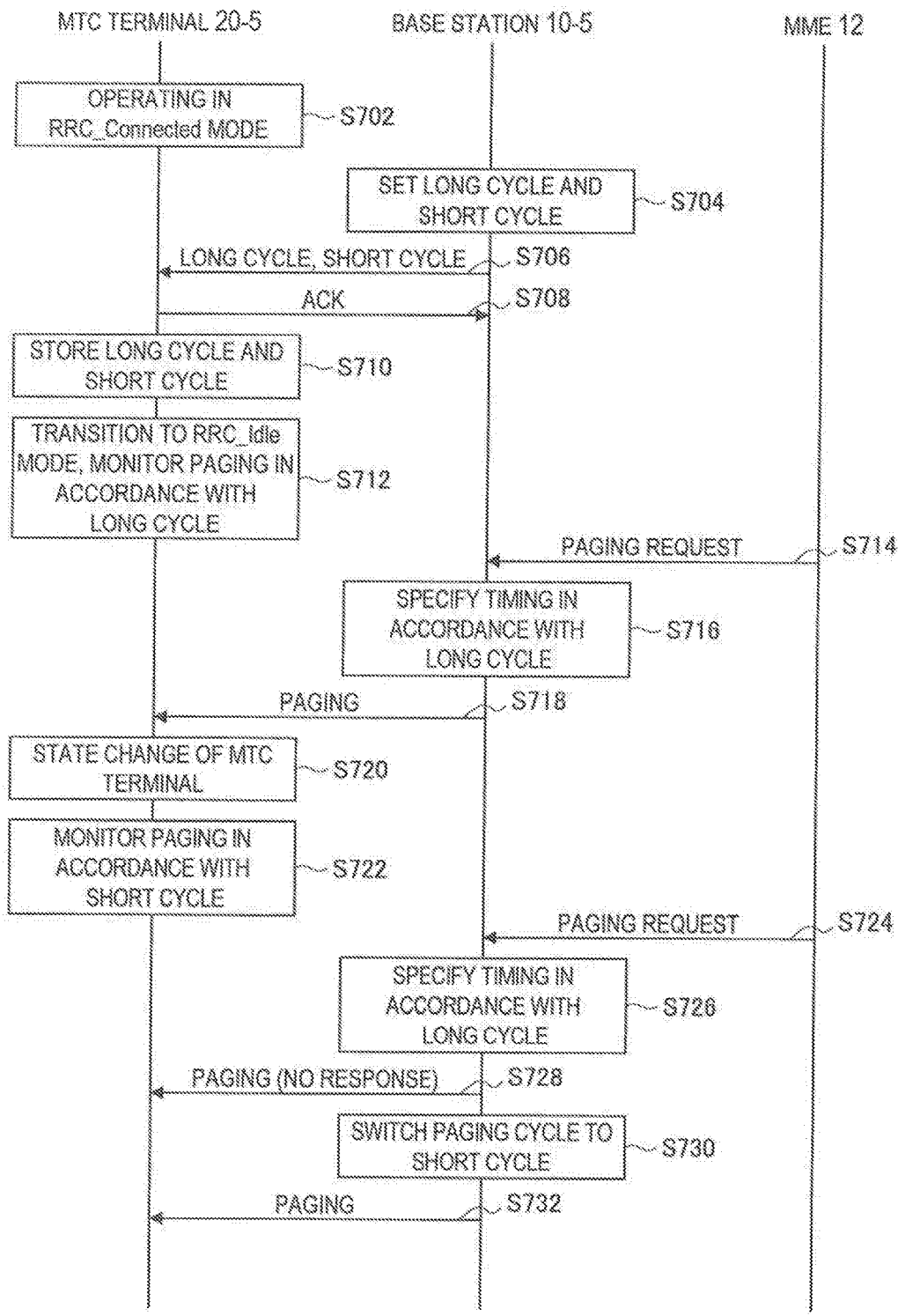

RADIO COMMUNICATION DEVICE, BASE STATION, METHOD FOR RADIO COMMUNICATION, AND RADIO COMMUNICATION SYSTEM WITH ACYCLIC PAGING CYCLES

CROSS-REFERENCE TO RELATED APPLICATIONS

The present application is a continuation application of U.S. patent application Ser. No. 13/981,641, filed Jul. 25, 2013, which is a National Stage of PCT/JP12/52742, filed Feb. 7, 2012, and claims the priority from prior Japanese Priority Patent Application JP2011-030656, filed Feb. 16, 2011, the entire content of which is hereby incorporated by reference.

TECHNICAL FIELD

The invention relates to a radio communication device, a base station, a method for radio communication, a program and a radio communication system.

BACKGROUND ART

Currently, standardization of a 4G radio communication system is under progress by 3GPP (Third Generation Partnership Project). According to the 4G, an improvement in maximum communication speed and a quality improvement in cell edges can be realized by using technologies such as relays and carrier aggregation. Further, considerations are given to improving coverage by introducing base stations other than eNodeB (macro-cell base station), such as NeNB (Home eNodeB, femtocell base station, compact base station for cell phones) and RRH (Remote Radio Head).
(Paging)
Further, in the LTE, an RRC_Connected mode and an RRC_Idle mode are defined. The RRC_Connected mode is a state in which a connection is established between the UE and the eNodeB, and the UE is capable of sending an uplink signal and receiving a downlink signal. On the other hand, the RRC_Idle mode is a state in which power of the UE is saved, and the UE in the RRC_Idle mode monitors the paging channel from the eNodeB, and transitions to the RRC_Connected mode when being called in the paging channel.

Here, for example, if the UE is called, since the eNodeB sends the paging channel at a timing that arrives in a cycle called a paging cycle, the UE of the RRC_Idle mode monitors the paging channel at the paging cycle. Although power consumption of the UE can be reduced when the paging cycle is long, there is a tendency that a delay from when the UE is called to when it responds becomes large. Notably, an intermittent receiving cycle that is similar to this is disclosed for example in Patent Literature 1.
(MTC)
On the other hand, debates on MTC (Machine Type Communications) are also in progress in the 3GPP. The MTC is generally synonymous to M2M (Machine to Machine), and refers to a communication between machines and not directly used by a human. The MTC primarily is performed between a server and a MTC terminal that is not directly used by a human.

For example, as a medical application of the MTC, a case may be assumed in which an MTC terminal collects electrocardiogram information of a human, and transmits the electrocardiogram information to a server by using uplink when a certain trigger condition is met. As another application of the MTC, a case may be assumed in which a vending machine is caused to function as an MTC terminal, and a server causes the vending machine under management to report sales once every certain cycle (for example, every 30 days).

Such an MTC terminal by way of example has the following features in general, however, not every MTC terminal needs to have all of the following features, and which of the features is to be endowed depends on applications.

Scarce needs to move (Low Mobility)
Transmission of small data (Online Small Data Transmission)
Very low power consumption (Extra Low Power Consumption)
Handled by grouping respective MTCs (Group-based MTC Features)

CITATION LIST

Patent Literature

Patent Literature 1: JP H09-83427 A

SUMMARY OF INVENTION

Technical Problem

However, as with the UE in the RRC_Idle mode, the paging cycle of a radio communication device that is not connected to a base station was in an equal interval. Due to this, there has been a problem that a degree of freedom of the paging cycle to be applied to a radio communication device is low.

Thus, the invention has been made in view of the above problem, and what is aimed by the invention is to provide novel and improved radio communication device, base station, method for radio communication, program and radio communication system that can flexibly switch the cycle for a communication of the paging channel.

Solution to Problem

According to an embodiment of the present disclosure, there is provided a radio communication device including a radio communication section that communicates by radio with a base station, a storage section that stores information indicating two or more intervals, and a receipt control section that switches, among the two or more intervals, a receiving cycle for receiving a paging channel sent from the base station in an unconnected state with the base station.

The receipt control section may switch the receiving cycle among the two or more intervals in accordance with a predetermined order.

The storage section may further store a switching timing of the receiving cycle notified from the base station, and the receipt control section may switch the receiving cycle at the switching timing stored in the storage section.

According to another embodiment of the present disclosure, there is provided a base station including a radio communication section that communicates by radio with a radio communication device, a storage section that stores information indicating two or more intervals, and a paging control section that causes the radio communication section to send a paging channel for the radio communication device at a timing arrived by switching among the two or more intervals in an unconnected state with the radio communication device.

According to another embodiment of the present disclosure, there is provided a radio communication device including a radio communication section that communicates by radio with a base station, a detecting section that detects a state change of the radio communication device, and a receipt control section that switches, among two or more cycles, a receiving cycle for receiving a paging channel sent from the base station according to a detection result obtained by the detecting section.

The radio communication section may receive information indicating the two or more cycles from the base station, and the radio communication device may further include a storage section that stores the information indicating the two or more cycles received by the radio communication section.

The receipt control section may switch, among the two or more cycles, the receiving cycle in an unconnected state with the base station.

The detecting section may detect a movement of the radio communication device as the state change.

The detecting section may detect that the radio communication device has moved to a predetermined location as the state change.

The detecting section may detect a reduction in remaining power of the radio communication device as the state change.

The radio communication device may have a vending machine function of selling a product, and the detecting section may detect a change in sales by the vending machine function or a reduction in a stock of the product as the state change.

According to another embodiment of the present disclosure, there is provided a method for radio communication, the method including detecting a state change in a radio communication device, and switching, among two or more cycles, a receiving cycle for receiving a paging channel from a base station, the base station being configured to send the paging channel in accordance with each of the two or more cycles according to a detection result of the state change.

According to another embodiment of the present disclosure, there is provided a program for causing a computer to function as a radio communication device that includes a radio communication section that communicates by radio with a base station, a detecting section that detects a state change of the radio communication device, and a receipt control section that switches, among two or more cycles, a receiving cycle for receiving a paging channel sent from the base station according to a detection result obtained by the detecting section.

According to another embodiment of the present disclosure, there is provided a base station including a radio communication section that communicates by radio with a radio communication device, and a paging control section that causes the radio communication section to send a paging channel for the radio communication device in accordance with each of two or more cycles.

According to another embodiment of the present disclosure, there is provided a radio communication system including a radio communication device, and a base station that sends a paging channel in accordance with each of two or more cycles. The radio communication device includes a detecting section that detects a state change of the radio communication device, and a receipt control section that switches, among the two or more cycles, a receiving cycle for receiving the paging channel according to a detection result obtained by the detecting section.

Advantageous Effects of Invention

As described above, according to the invention, a cycle for a communication of a paging channel can flexibly be switched.

BRIEF DESCRIPTION OF DRAWINGS

FIG. 25 is an explanatory diagram showing a switch of a paging cycle by the base station of the fifth embodiment of the invention.

FIG. 26 is an explanatory diagram showing a switch of the paging cycle by the base station of the fifth embodiment of the invention.

FIG. 27 is a sequence diagram showing an operation of the fifth embodiment of the invention.

DESCRIPTION OF EMBODIMENT

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, in the description and the drawings, there may also be cases in which a plurality of constituent features having substantially the same functional configuration is distinguished by adding different alphabets after the same reference sign. For example, the plurality of constituent features having substantially the same functional configuration may be distinguished as MTC terminals 20A, 20B, and 20C. However, in cases where the respective one of the plurality of constituent features having substantially the same functional configuration does not need to be particularly distinguished, only the same reference sign will be given. For example, when the MTC terminals 20A, 20B, and 20C do not particularly need to be distinguished, each will simply be termed a MTC terminal 20.

Further, the "description of embodiments" will be described in accordance with the order in the below appendix.

1. Overview of Radio Communication System
1-1. Overview of radio communication system
1-2. Configuration of frame
1-3. Paging
1-4. Detailed description of paging channel
1-5. Blind decoding
1-6. Paging expected in MTC
2. Description of Respective Embodiments
2-1. First embodiment
(Configuration of base station of the first embodiment)
(Configuration of MTC terminal of the first embodiment)
(Operation of the first embodiment)
2-2. Second embodiment
(Configuration of base station of the second embodiment)
(Configuration of MTC terminal of the second embodiment)
(Operation of the second embodiment)
2-3. Third embodiment
(Configuration of base station of the third embodiment)
(Configuration of MTC terminal of the third embodiment)
(Operation of the third embodiment)
2-4. Fourth embodiment
(Configuration of base station of the fourth embodiment)
(Configuration of MTC terminal of the fourth embodiment)
(Operation of the fourth embodiment)
2-5. Fifth embodiment
(Configuration of base station of the fifth embodiment)
(Operation of the fifth embodiment)
3. Conclusion

1. OVERVIEW OF RADIO COMMUNICATION SYSTEM

Currently, standardization of a 4G radio communication system is in progress in 3GPP. Embodiments of the invention can be adapted to the 4G radio communication system by way of examples, so an overview of the 4G radio communication system will be described.

1-1. Configuration of Radio Communication System

Figure 1:
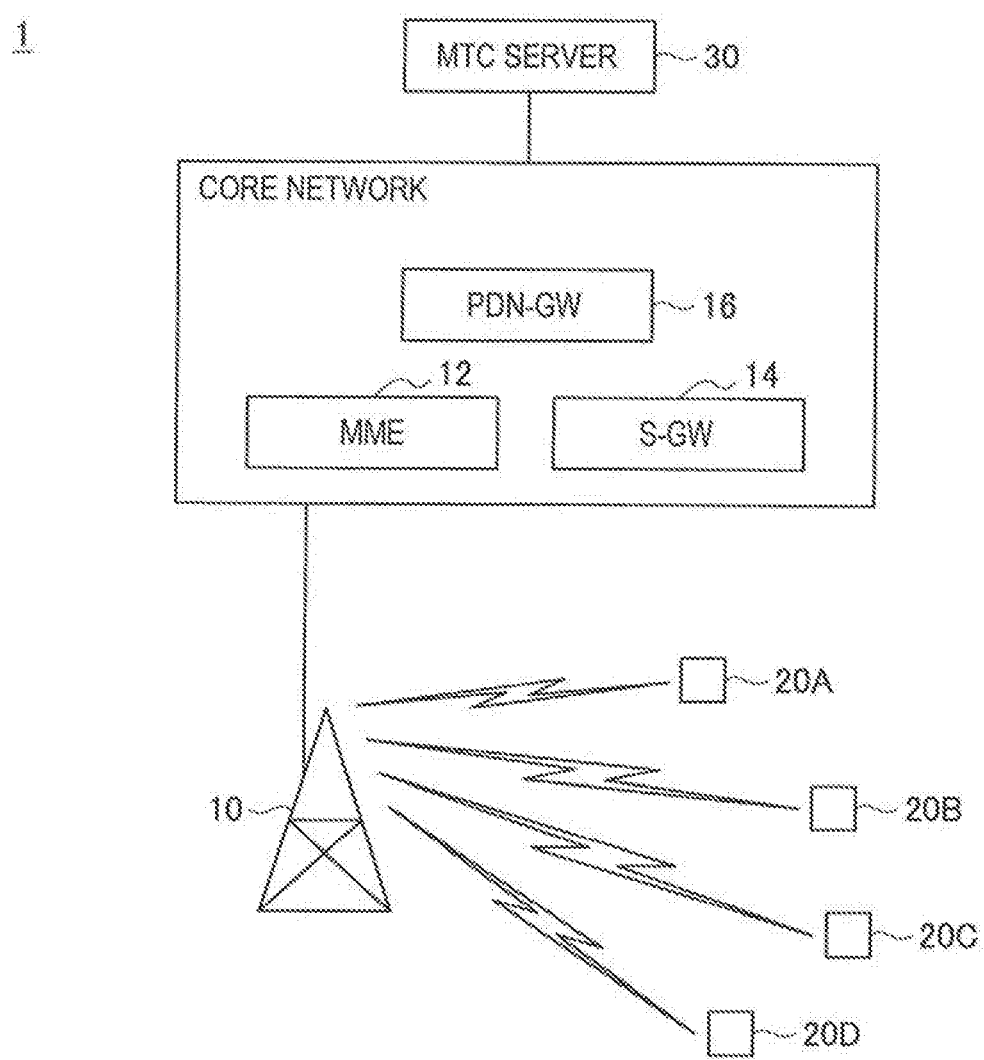
FIG. 1 is an explanatory diagram showing an example of a configuration of a radio communication system.

FIG. 1 is an explanatory diagram showing an example of a configuration of a radio communication system 1. As shown in FIG. 1, the radio communication system 1 includes a base station 10, a core network including an MME (Mobility Management Entity) 12, an S-GW (Serving Gateway) 14, and a PDN (Packet Data Network)-GW 16, MTC terminals 20, and an MTC server 30.

Embodiments of the invention can be adapted to radio communication devices such as the base station 10 and the MTC terminals 20 shown in FIG. 1. Notably, the base station 10 may for example be an eNodeB, a relay node, or a Home eNodeB that is a compact base station for home use. Further, the MTC terminals 20 are examples of user equipment (UE), and adaptations to non-MTC terminals such as a cell phone, PC (Personal Computer), and the like is also possible as embodiments of the invention.

The base station 10 is a radio base station that communicates with the MTC terminals 20. Although only one base station 10 is shown in FIG. 1, a large number of base stations 10 are connected to the core network in reality. Further, although depiction in FIG. 1 is omitted, the base station 10 communicates also with other user equipments such as a non-MTC terminal.

The MME 12 is a device that performs controls of settings, opening, and hand-over of a data communication session. The MME 12 is connected to the base station 10 via an interface called X2.

The S-GW 14 is a device that performs routing and transfer of user data. The PDN-GW 16 functions as a connecting node with an IP service network, and transfers the user data to and from the IP service network.

The MTC terminals 20 are radio terminals specialized for MTC, which is a communication between machines and is not used directly by a human, which is under discussion in the 3GPP. The MTC terminals 20 perform radio communication in accordance with an application with the base station 10. Further, the MTC terminals 20 perform bidirectional communication with the MTC server 30 via the core network.

For example, as a medical application of the MTC, a case may be assumed in which an MTC terminal 20 collects electrocardiogram information of a human, and transmits the electrocardiogram information to the server by using uplink when a certain trigger condition is met. As another application of the MTC, a case may be assumed in which a vending machine is caused to function as the MTC terminal 20, and the MTC server 30 causes the vending machine under management to report sales once every certain cycle (for example, every 30 days).

Such an MTC terminal 20 by way of example has the following features in general, however, not every MTC terminal 20 needs to have all of the following features, and which of the features is to be assigned depends on applications.

Scarce needs to move (Low Mobility)
Transmission of small data (Online Small Data Transmission)
Very low power consumption (Extra Low Power Consumption)
Handled by grouping respective MTCs (Group-based MTC Features)

1-2. Configuration of Frame

Although details of the aforementioned base station 10 and MTC terminals 20 are not decided, they are expected to perform radio communication conforming to communication between the eNodeB and the UE. Thus, hereinbelow, a radio frame shared between the eNodeB and the UE will be described. Contents to be described hereinbelow can be applied to the communication between the base station 10 and the MTC terminals 20.

Figure 2:
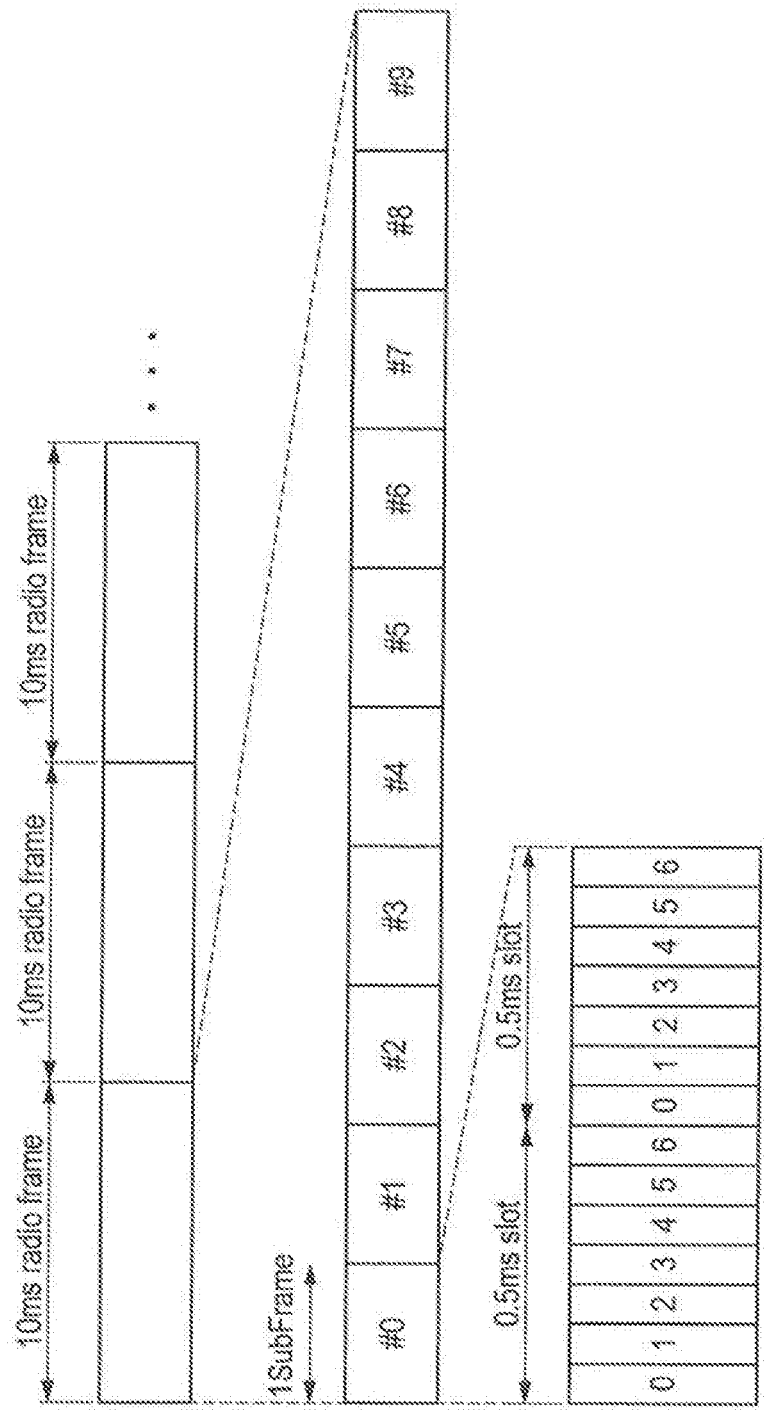
FIG. 2 is an explanatory diagram showing a 4G frame format.

FIG. 2 is an explanatory diagram showing a 4G frame format. As shown in FIG. 2, a 10 ms radio frame is configured of ten 1 ms sub frames #0 to #9. Further, each 1 ms sub frame is configured of two 0.5 ms slots. Further, each 0.5 ms slot is configured of seven Ofdm symbols.

Notably, the Ofdm symbol is a unit used in a communication scheme of an OFDM (Orthogonal Frequency Division Multiplexing) modulation system, and is a unit by which data processed in one FFT (Fast Fourier Transform) is outputted.

At a head of each 1 ms sub frame shown in FIG. 2, a control signal called a PDCCH (Phy Downlink Control Channel) is added. One Ofdm symbol to three Ofdm symbols at the head of the sub frame are used for a transmission of the PDCCH. That is, there are cases in which one Ofdm symbol is used for the PDCCH transmission, and there also are cases in which three Ofdm symbols are used for the PDCCH transmission.

Notably, a region in the radio frame used for the PDCCH transmission is called a control region, and a region in the radio frame used for transmissions of a PDSCH (Phy Downlink Shared Channel) or a PUSCH (Phy Uplink Shared Channel) is called a data region.

1-3. Paging

In the LTE, an RRC_Connected mode and an RRC_Idle mode are defined. The RRC_Connected mode is a state in which a connection is established between the UE and the eNodeB, and the UE is capable of sending an uplink signal and receiving a downlink signal. On the other hand, the RRC_Idle mode is a state in which power of the UE is saved, and the UE in the RRC_Idle mode monitors the paging channel from the eNodeB, and transitions to the RRC_Connected mode when being called in the paging channel. In the RRC_Idle mode, information of the UE does not exist in the eNodeB, and in which of tracking areas (paging areas) the UE exists is registered in an MME connected to the eNodeB by a wired connection called an S1-MME interface.

The tracking areas are several tens to hundred eNodeBs that are in proximity, and the MME calls the UE by paging channel (incoming call) from all of the eNodeBs existing in the tracking area of the UE when a call is made to the UE.

Due to this, the UE of the RRC_Idle mode monitors the paging channel by performing a receiving process at a cycle by which the paging channel may be sent, and transition to the RRC_Connected mode when the call by the paging channel is made.

Notably, the UE of the RRC_Idle mode stops clocks and power to a part of hardware so as to save power other than when it is in the receiving process for receiving the paging channels. Further, the UE of the RRC_Idle mode restarts power supply to the hardware before the time when the paging channels may be sent from the eNodeBs, performs the receiving process of the paging channels, and then again enters the state of saving power after the receiving process.

1-4. Detailed Description of Paging Channel

In the above described PDCCH, a minimum unit of control information for each UE is called a CCE (Control Channel Element). In the case of sending the paging channel to the UE in the PDCCH, the eNodeB sends the CCE including a PI (Paging Indicator) indicating which of resources in the PDSCH the UE should use to receive the paging channel in accordance with the PDSCH according to a predetermined cycle. That is, the CCE includes the receipt permission (grants) that is scheduling information.

In the case where the PI is included in the CCE designated to the UE itself, the UE can acquire information notifying a presence of a downlink signal addressed to the UE itself by receiving the paging channel sent on the PDSCH indicated by the PI. Notably, a determination of whether the CCE is designated to the UE itself or not is performed by blind decoding to be described later.

Here, the PI is inserted in the PDCCH in accordance with the predetermined cycle when a paging channel for the UE is present (LTE The UMTS Long Term Evolution, Edited by: Stefania Sesia, Issam Toufik, Matthew Baker, 3.4 Paging, p. 77). This predetermined cycle is called a DRX (Discontinues reception) cycle, or a paging cycle, and is set for each UE. Such a paging cycle is set by a higher layer signaling such as signaling between the UE and the MME on a NAS (Non-Access Stratum) protocol. Although power consumption of the UE can be reduced when the paging cycle is long, there is a tendency that a delay from when the UE is called to when it responds becomes large.

1-5. Blind Decoding

A P-RNTI for receiving a C-RNTI (Cell Radio Network Temporary Identify) that is an identifier of each UE and the paging channel is allotted to each UE.

Figure 3:
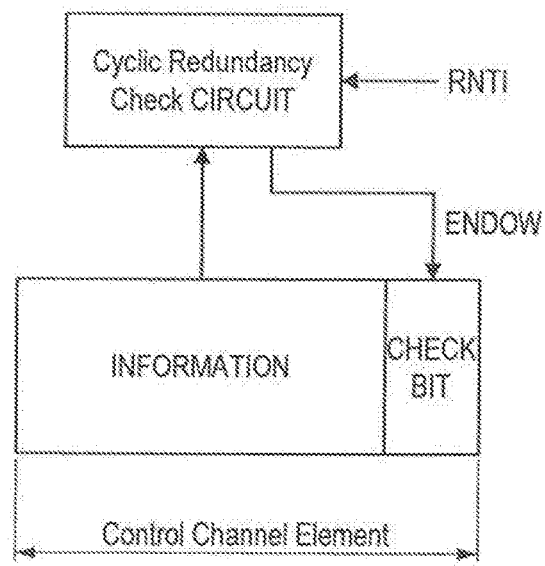
FIG. 3 is an explanatory diagram showing generation of a CCE.

As shown in FIG. 3, the eNodeB adds check bits obtained by a CRC (Cyclic Redundancy Check) to the CCE while masking the control information such as the PI by a P-RNTI, in order to specify the destination of the CCE. Here, the masking may be an exclusive OR (XOR) calculation of the control information and the P-RNTI, or may be a serial coupling of the control information and the P-RNTI.

When the PDCCH configured of a plurality of CCEs is received, the UE extracts the CCE identified by the UE's own P-RNTI by the blind decoding. Hereinbelow, a specific description will be given with reference to FIG. 4.

Figure 4:
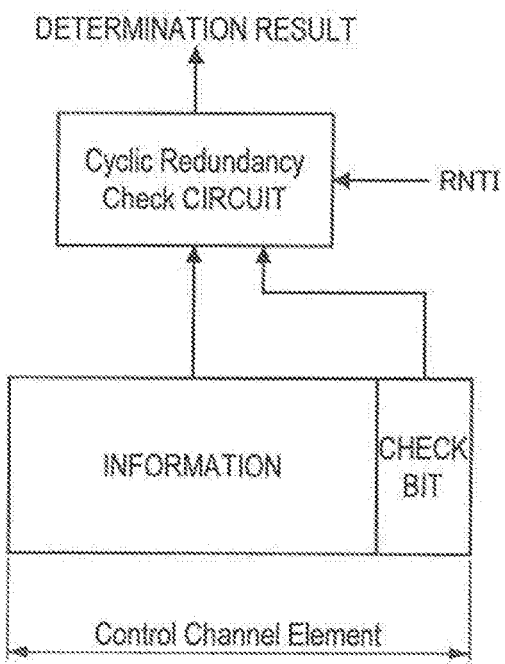
FIG. 4 is an explanatory diagram showing blind decoding.

FIG. 4 is an explanatory diagram showing the blind decoding. As shown in FIG. 4, the UE performs a CRC check while demasking the respective CCEs by its own P-RNTI as the blind decoding. That is, the UE performs the CRC check of each CCE on the assumption that each CCE is addressed to the UE itself, and determines a CCE with a normal result is the CCE designated to the UE itself.

By such a blind decoding, the UE determines the CCE designated to the UE itself sent from the eNodeB, and can obtain the PI from the CCE designated to the UE itself.

1-6. Paging Expected in MTC

As described in "1-1. Configuration of radio communication system", the MTC is required of a super low power consumption. An application by the MTC is expected with frequent data collection and settings once a week or once a month. For example, an MTC terminal mounted on a vending machine is assumed to report sales in accordance with a monthly command from a data collecting center (MTC server).

Accordingly, in the case of performing a setting to read the data of the MTC terminal from the eNodeB once a month, the eNodeB is desired to send a paging (PI+paging channel) at different cycles such as thirty days, thirty-one days, twenty-nine days, and twenty-eight days, depending on a difference of days in each month. Accordingly, although a realization of acyclic paging cycles is important, in a current LTE that is based on paging cycles of an equal interval, it is difficult to comply with the acyclic paging cycles.

Notably, there may be a method of performing a long cycled and acyclic paging in an application layer, however, since sending and receiving of the paging channel needs to be performed in a specific sub frame with a 1 ms width, such a highly accurate control in the application layer is difficult.

Further, although it is possible to predeterminedly set to report to the MTC terminal at the end of months in the acyclic pattern such as thirty days, thirty-one days, twenty-nine days, and twenty-eight days, such a predetermined settings has a defect in that the report is made even in cases where the MTC server does not need such a report. Since it is expected that the number of the MTC terminals will be enormous, a congestion may occur within a network if such unnecessary reports are allowed.

Thus, the embodiments of the invention have been created with the above circumstance as a point of concern. According to each of the embodiments of the invention, the cycle for the communication of the paging channel can flexibly be switched. Hereinbelow, the respective embodiments of such an invention will be described in detail with reference to the drawings.

2. DESCRIPTION OF RESPECTIVE EMBODIMENTS

2-1. First Embodiment

Firstly, by referring to FIG. 5 to FIG. 8, the first embodiment of the invention will be described. According to the first embodiment of the invention, as will be described below in detail, paging can be used based on an acyclic pattern.

Configuration of Base Station of First Embodiment

Figure 5:
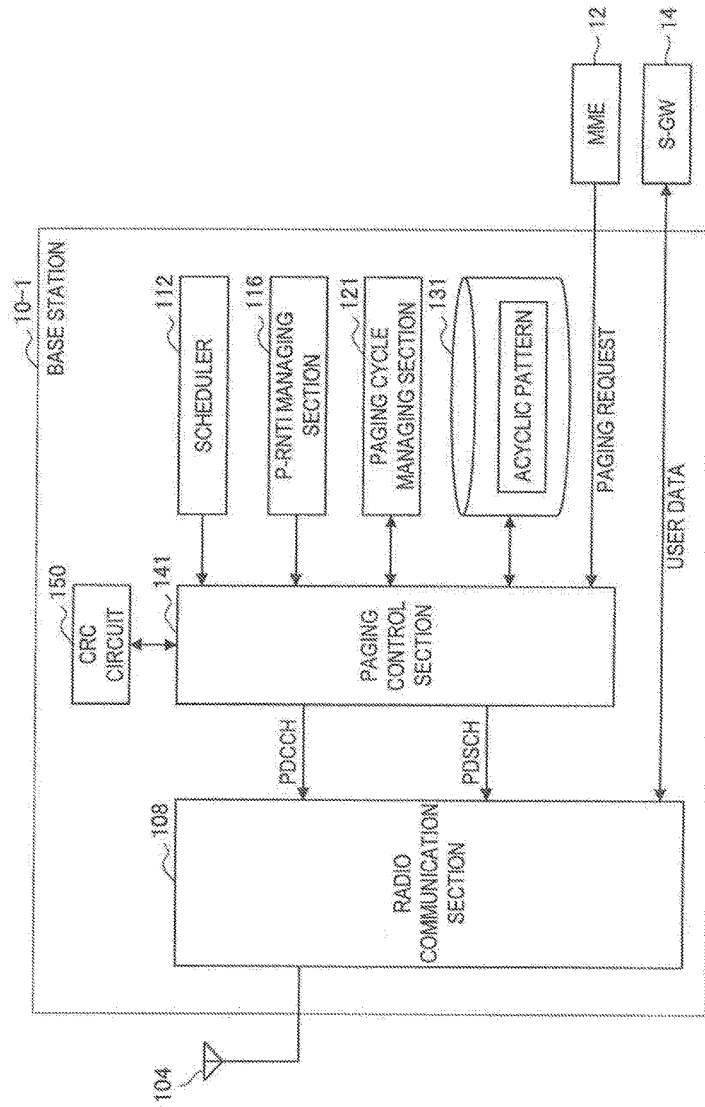
FIG. 5 is a functional block diagram showing a configuration of a base station of a first embodiment of the invention.

FIG. 5 is a functional block diagram showing a configuration of a base station 10-1 of the first embodiment of the invention. As shown in FIG. 5, the base station 10-1 of the first embodiment of the invention includes an antenna 104, a radio communication section 108, a scheduler 112, a P-RNTI managing section 116, a paging cycle managing section 121, a storage section 131, a paging control section 141, and a CRC circuit 150.

The antenna 104 functions as a sending section that sends a sending signal, such as a PDCCH (control signal) and a PDSCH (data signal) supplied from the radio communication section 108, as a radio signal, and a receiving section that supplies a radio signal, which is sent from a radio communication device such as an MTC terminal 20 of the first embodiment, to the radio communication section 108 by converting the radio signal into an electric receiving signal. Notably, in FIG. 5, although an example in which the base station 10-1 has one antenna is shown, the base station 10-1 may include a plurality of antennas. In this case, the base station 10 is capable of realizing a MIMO (Multiple Input Multiple Output) communication, and a diversity communication and the like.

The radio communication section 108 performs a sending radio process such as modulation, DA conversion, filtering, amplification, up-conversion and the like of the sending signal such as PDCCH supplied from the paging control section 141 and PDSCH including user data supplied from a S-GW 14. Further, the radio communication section 108 performs a receiving radio process such as down-conversion, filtering, DA conversion, demodulation and the like of the receiving signal supplied from the antenna 104.

The scheduler 112 allots resources for data communication to each of the MTC terminals 20. That is, the scheduler 112 allots a resource block in the PDSCH that each MTC terminal 20 should receive, and allots a resource block in the PUSCH that each MTC terminal 20 should send. For example, in a case where a paging channel to an MTC terminal 20 is present, the scheduler 116 allots a resource in the PDSCH of a radio frame (10 ms radio frames=ten sub frames) according to a paging cycle of the MTC terminal 20 for sending the paging channel to the MTC terminal 20.

The P-RNTI managing section 116 manages the allotment of the P-RNTI to each MTC terminal 20. Notably, the P-RNTI is used to identify a destination of a CCE including a PI.

The paging cycle managing section 121 sets a paging cycle of each MTC terminal 20 during a non-connected period (during an RRC_Idle mode). More specifically, the paging cycle managing section 121 of the embodiment sets the paging cycle for sending the paging channel to a MTC terminal 20-1 of the first embodiment in a combination of two or more different intervals, that is, in an acyclic pattern. For example, the paging cycle managing section 121 normally sets the paging cycle at a 10 radio frame cycle, however, it sets the paging cycle in an acyclic pattern of "3, 5, 2, 9, . . . ".

Notably, since this acyclic pattern is shared with the MTC terminal 20-1, it is not realistic to set unlimited numbers of acyclic patterns as the paging cycle. Due to this, an iteration of the set acyclic pattern may be treated as the paging cycle.

Further, the paging cycle managing section 121 may set the acyclic pattern in accordance with an instruction from a network side, such as an MME 12 or an MTC server 30. For example, in a case where a setting at a cycle that comes at an end of the month such as on 31st, 28th, 31st, and 30th is instructed from the network side, the paging cycle managing section 121 may set the acyclic pattern by converting the instructed cycles into radio frame units.

The storage section 131 stores the acyclic pattern of each MTC terminal 20 set by the paging cycle managing section 121.

The paging control section 141 generates the CCE including the PI in a case where paging information (system information, incoming call and the like) to the MTC terminal 20-1 is present. More specifically, the paging control section 141 generates the PI, and the CCE that is obtained by the CRC circuit 150 by masking the PI by the P-RNTI of the MTC terminal 20-1.

Here, the masking may be a calculation of an exclusive OR (XOR) of the PI and the P-RNTI, or may be a serial coupling of the PI and the P-RNTI. Due to this, the MTC terminal 20-1 to which the P-RNTI used in the masking is allotted can be designated as the destination of the PI. The CCE generated as above is supplied to the radio communication section 108, and is mapped in the PDCCH.

Further, the paging control section 141 generates the paging channel including paging information. The paging channel is supplied to the radio communication section 108, and is mapped in a resource on the PDSCH indicated by the PI. Notably, the paging information such as the incoming call is supplied via an S1-MME interface from the MME 12 that handles the control information such as the paging and a handover.

Further, the paging control section 141 of the embodiment controls the paging (sending of the PI and the paging channel) to the MTC terminal 20-1 in the RRC_Idle mode in radio frames in accordance with the acyclic pattern stored in the storage section 131 in connection to the MTC terminal 20-1. Hereinbelow, a more detailed description will be given regarding this point with reference to FIG. 6.

Figure 6:
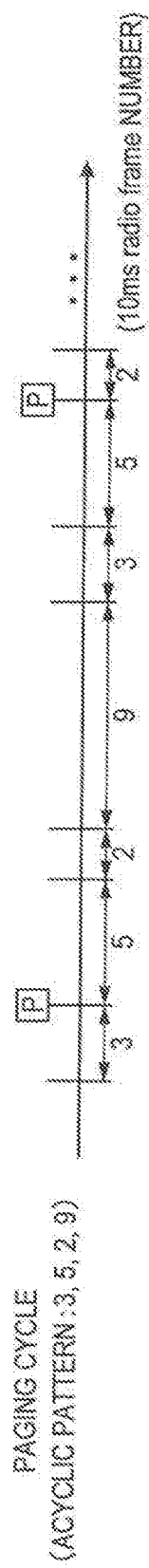
FIG. 6 is an explanatory diagram showing a specific example of paging by the base station of the first embodiment of the invention.

FIG. 6 is an explanatory diagram showing a specific example of the paging by the base station 10-1. In a case where the acyclic pattern stored in the storage section 131 in connection to the MTC terminal 20-1 is "3, 5, 2, 9", the paging cycle becomes an iteration of the acyclic pattern as shown in FIG. 6. In the case where the paging information for the MTC terminal 20-1 is present, the paging control section 141 of the base station 10-1 controls the paging in the radio frames that arrive in accordance with the acyclic pattern as shown in a square enclosure of "P" in FIG. 6.

As described above, the base station 10-1 of the first embodiment of the invention can set the acyclic pattern that arrives at the end of months such as 31st (January), 28th (February), 31st (March), 30th (April), . . . , for example, as the paging cycle. Due to this, since the base station 10-1 can perform the paging only at the end of the month when the data report needs to be made from the MTC terminal 20-1, consumption amounts of radio resources and the MTC terminal 20-1 can be lessened compared to a case of predeterminedly setting the MTC terminal 20-1 to report data each time at the end of the months.

(Configuration of MTC Terminal of the First Embodiment)

Figure 7:
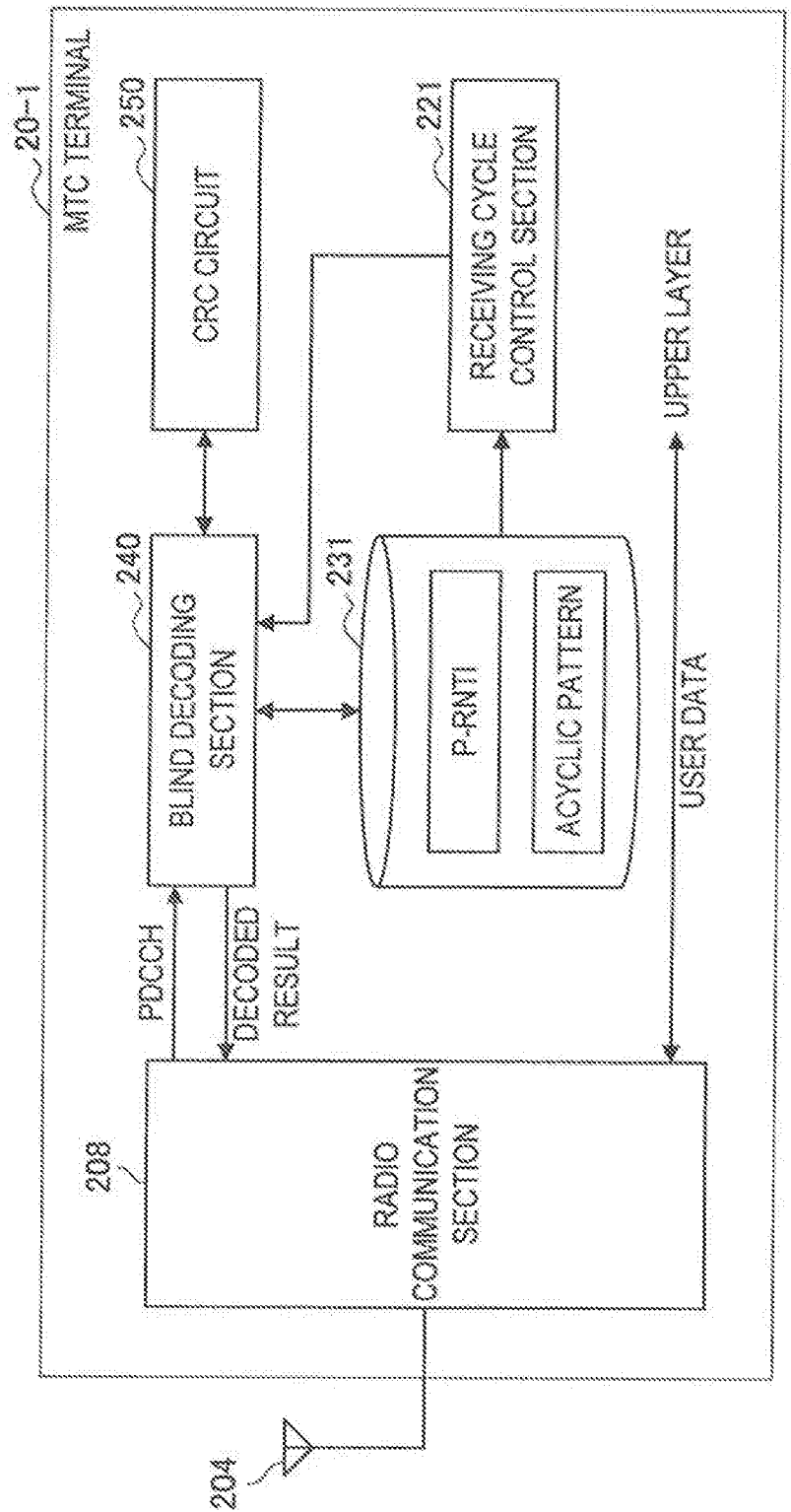
FIG. 7 is a functional block diagram showing a configuration of an MTC terminal of the first embodiment of the invention.

Next, with reference to FIG. 7, a configuration of the MTC terminal 20-1 of the first embodiment.

FIG. 7 is a functional block diagram showing the configuration of the MTC terminal 20-1 of the first embodiment. As shown in FIG. 7, the MTC terminal 20-1 of the first embodiment includes an antenna 204, a radio communication section 208, a receiving cycle control section 221, a storage section 231, a blind decoding section 240, and a CRC circuit 250.

The antenna 204 functions as a sending section that sends a sending signal, such as a PUSCH (data signal) supplied from the radio communication section 208, as a radio signal, and a receiving section that supplies radio signals such as PDCCH and PDSCH, which are sent from the base station 10-1, to the radio communication section 208 by converting the radio signals into electric receiving signals. Notably, in FIG. 7, although an example in which the MTC terminal 20-1 has one antenna is shown, the MTC terminal 20-1 may include a plurality of antennas. In this case, the MTC terminal 20-1 is capable of realizing the MIMO (Multiple Input Multiple Output) communication, and the diversity communication and the like.

The radio communication section 208 performs a sending radio process of modulation, DA conversion, filtering, amplification, up-conversion and the like of the user data supplied from a higher layer. Further, the radio communication section 208 performs a receiving radio process of down-conversion, filtering, DA conversion, demodulation and the like of the receiving signals supplied from the antenna 204.

The storage section 231 stores various types of information used in the communication with the base station 10-1. For example, the storage section 231 stores the P-RNTI allotted to the MTC terminal 20-1 by the P-RNTI managing section 116 of the base station 10-1, the acyclic pattern set by the paging cycle managing section 121 of the base station 10-1 and the like.

The receiving cycle control section 221 is a receipt control section that controls a receiving cycle (DRX cycle) for monitoring the paging in the RRC_Idle mode. More specifically, the receiving cycle control section 221 causes the blind decoding section 240 to perform blind decoding in accordance with the radio frames complying with the acyclic pattern stored in the storage section 231.

The blind decoding section 240 extracts the CCE identified by the P-RNTI given to the MTC terminal 20-1 by the blind decoding when the PDCCH is supplied from the radio communication section 208.

Yet more specifically, the blind decoding section 240 cooperates with the CRC circuit 250 to perform a CRC check by demasking each CCE by the P-RNTI given to the MTC terminal 20-1. Then, the blind decoding section 240 extracts the CCE with a normal result, and supplies the resource on the PDSCH indicated by the PI described in the CCE as a decoded result to the radio communication section 208. The radio communication section 208 can achieve the paging channel sent from the base station 10-1 b base station 10-1 by performing the receiving process on the resource on the PDSCH indicated by the decoded result.

As described above, the MTC terminal 20-1 of the first embodiment can monitor the paging in accordance with the acyclic pattern set by the base station 10-1. Notably, in the above, an example in which the base station 10-1 sets the acyclic pattern and notifies the MTC terminal 20-1 is described, however, the MTC terminal 20-1 may set the acyclic pattern and notify the acyclic pattern to the base station 10-1.

(Operation of the First Embodiment)

In the above, the configurations of the base station 10-1 and the MTC terminal 20-1 of the first embodiment of the invention was described. Subsequently, by referring to FIG. 8, an operation of the first embodiment of the invention will be described.

Figure 8:
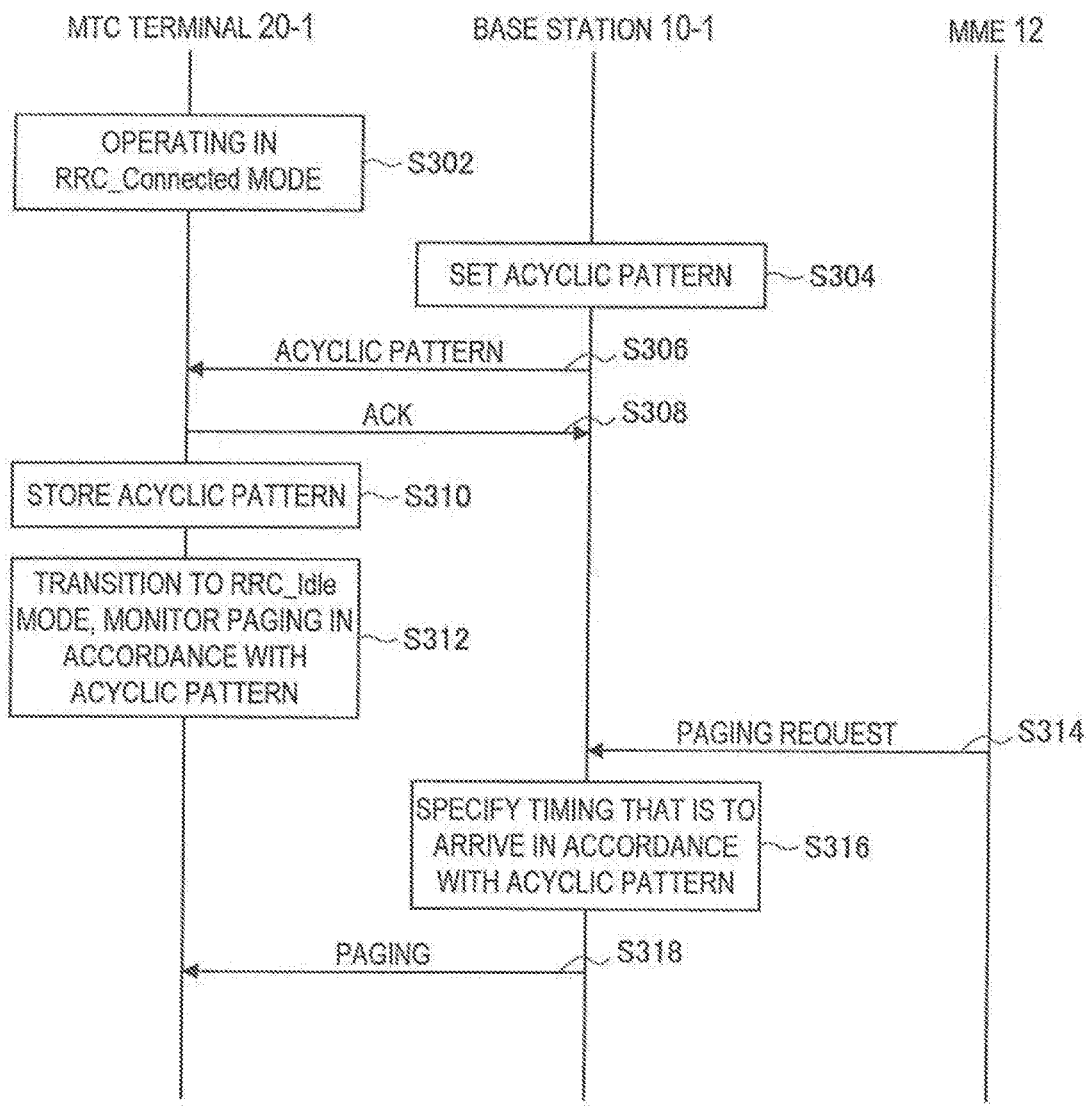
FIG. 8 is a sequence diagram showing an operation of the first embodiment of the invention.

FIG. 8 is a sequence diagram showing an operation of the first embodiment of the invention. As shown in FIG. 8, in a state in which the MTC terminal 20-1 is operating in the RRC_Connected mode (S302), when the base station 10-1 sets the acyclic pattern (S304), the base station 10-1 notifies the acyclic pattern to the MTC terminal 20-1 (S306).

The MTC terminal 20-1 returns an ACK to the notification of the acyclic pattern to the base station 10-1 (S308), and stores the acyclic pattern in the storage section 231 (S310).

Thereafter, when the MTC terminal 20-1 transitions to the RRC_Idle mode, the receiving cycle control section 221 causes the blind decoding section 240 to monitor the paging (PI) in accordance with the acyclic pattern stored in the storage section 231 (S312).

On the other hand, when a paging request is supplied from the MME 12 via the S1-MME interface (S314), the base station 10-1 specifies a timing that arrives in accordance with the acyclic pattern set in S304 (S316), and performs paging at the specified timing (S318). Here, since the MTC terminal 20-1 is monitoring the paging at the acyclic pattern, the paging from the base station 10-1 can be achieved.

2-2. Second Embodiment

In the above, the first embodiment of the invention was described. Now, the second embodiment of the invention will be described. According to the second embodiment of the invention, as will be described in detail, a paging cycle can be switched among a plurality of cycles at a certain timing.

(Configuration of Base Station of the Second Embodiment)

Figure 9:
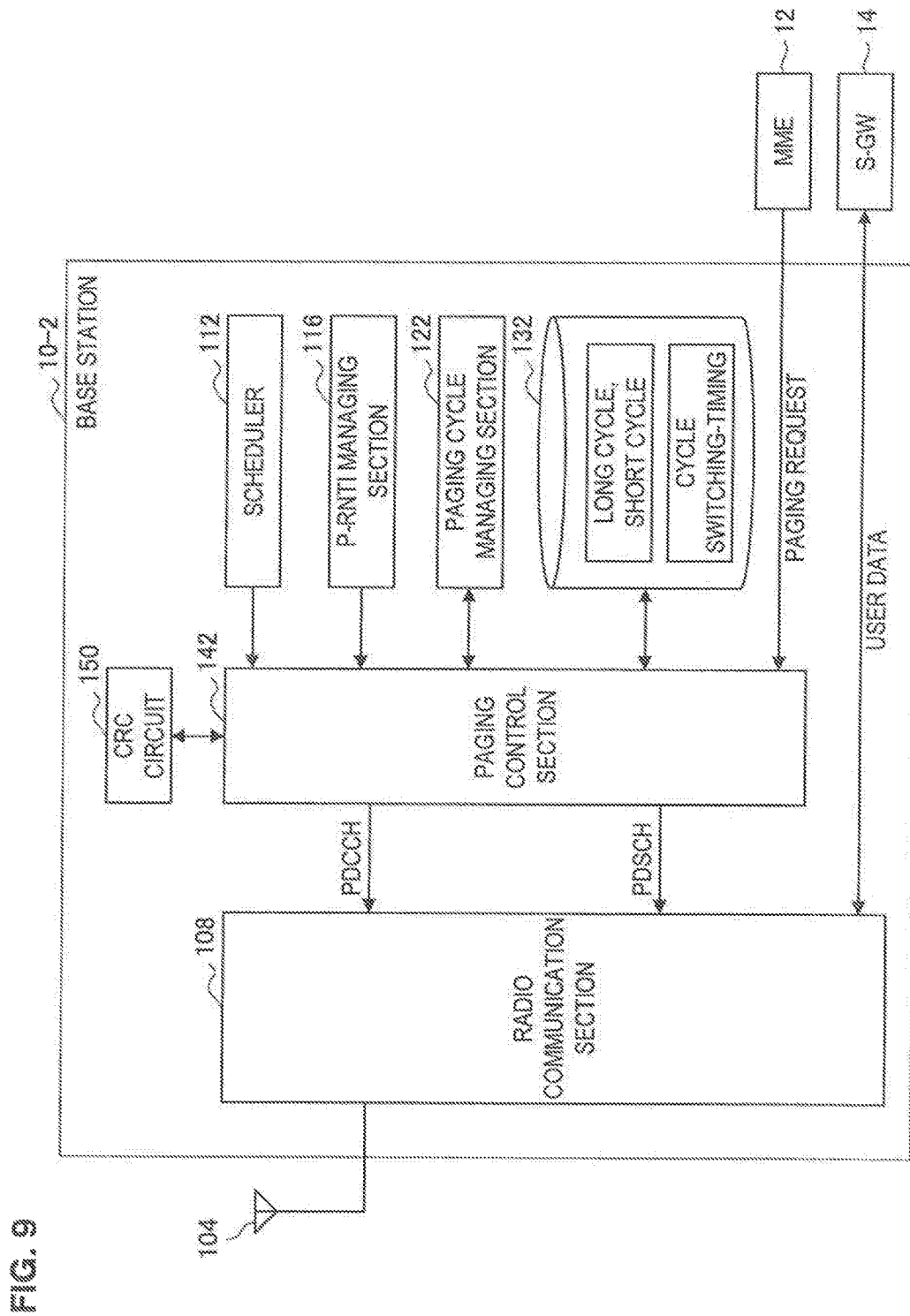
FIG. 9 is a functional block diagram showing a configuration of a base station of a second embodiment of the invention.

FIG. 9 is a functional block diagram showing a configuration of a base station 10-2 of the second embodiment of the invention. As shown in FIG. 9, the base station 10-2 of the second embodiment of the invention includes an antenna 104, a radio communication section 108, a scheduler 112, a P-RNTI managing section 116, a paging cycle managing section 122, a storage section 132, a paging control section 142, and a CRC circuit 150. Functions of the antenna 104, the radio communication section 108, the scheduler 112, the P-RNTI managing section 116, and the CRC circuit 150 are as described in the first embodiment, so hereinbelow, configurations that differ from the first embodiment will primarily be described.

The paging cycle managing section 122 sets a plurality of cycles for paging to each MTC terminal 20-2 operating in an RRC_Idle mode, and a switching timing of the plurality of cycles. For example, the paging cycle managing section 122 sets a long cycle, a short cycle, and the switching timing (time, or frame) of the long cycle and the short cycle. The cycle switching timing may be a time to switch the cycle, or a frame number and the like, or a duration time of the long cycle or the short cycle, or a continued frame number.

Notably, in a case where the paging cycle managing section 122 sets three or more cycles, information for determining as to which of the cycles should be switched to at each cycle switching-timing is necessary. Thus, the paging cycle managing section 122 may set each cycle switching timing by associating the cycle after the switch. Alternatively, the paging cycle managing section 122 may set a switching order of each cycle. By such a configuration, use of cycles of three or more such as the long cycle, an intermediate cycle, the short cycle and the like becomes possible.

The storage section 132 stores the plurality of cycles of each MTC terminal 20 set by the paging cycle managing section 122, and information indicating the timing to switch the plurality of cycles.

The paging control section 142 controls the paging to the MTC terminal 20-2 in the RRC_Idle mode in accordance with radio frames according to the plurality of cycles and the cycle switching timing stored in the storage section 132 in connection to the MTC terminal 20-2. Hereinbelow, this feature will be described more specifically with reference to FIG. 10.

Figure 10:
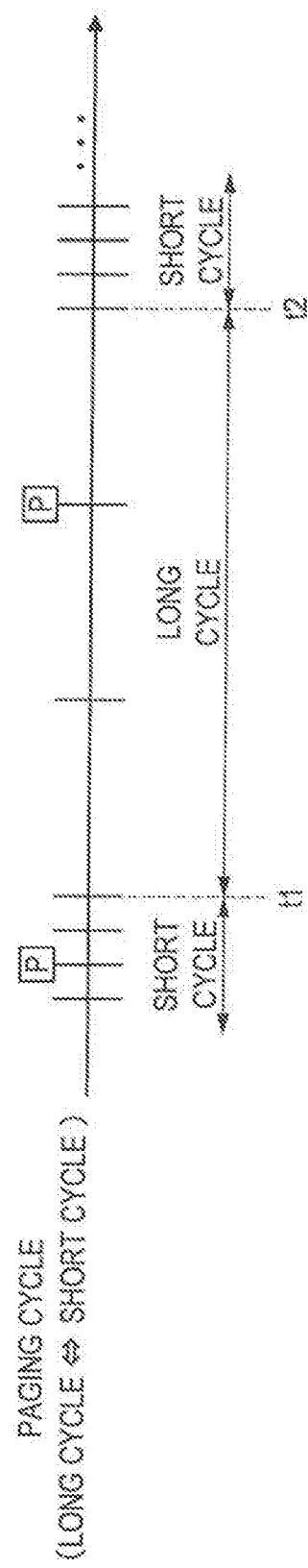
FIG. 10 is an explanatory diagram showing a specific example of paging by the base station of the second embodiment of the invention.

FIG. 10 is an explanatory diagram showing a specific example of the paging by the base station 10-2. In a case where the long cycle, the short cycle, and cycle switching-timings t1, t2 are stored in the storage section 132 in connection to the MTC terminal 20-2, the paging control section 142 of the base station 10-2 switches the paging cycle from the short cycle to the long cycle at t1 as shown in FIG. 10. Further, the paging control section 142 switches the paging cycle from the long cycle to the short cycle at t2.

Then, in a case where paging information to the MTC terminal 20-2 is present, the paging control section 142 of the base station 10-2 controls the paging by the radio frames that arrive in accordance with the switching of the long cycle and the short cycle as shown in a square enclosure of "P" in FIG. 10.

As described above, by for example arranging the short cycle near the end of months, the base station 10-2 of the second embodiment of the invention can perform paging with less delay from an occurrence of a paging request at the end of months even if days in each month differ. Further, in the second embodiment of the invention, the long cycle, the short cycle, and the cycle switching-timing can be shared between the base station 10-2 and the MTC terminal 20-2. Due to this, compared to the first embodiment, an information amount of signaling from the base station 10-2 to the MTC terminal 20-2 can more easily be controlled.

(Configuration of MTC Terminal of the Second Embodiment)

Next, the configuration of the MTC terminal 20-2 of the second embodiment will be described with reference to FIG. 11.

Figure 11:
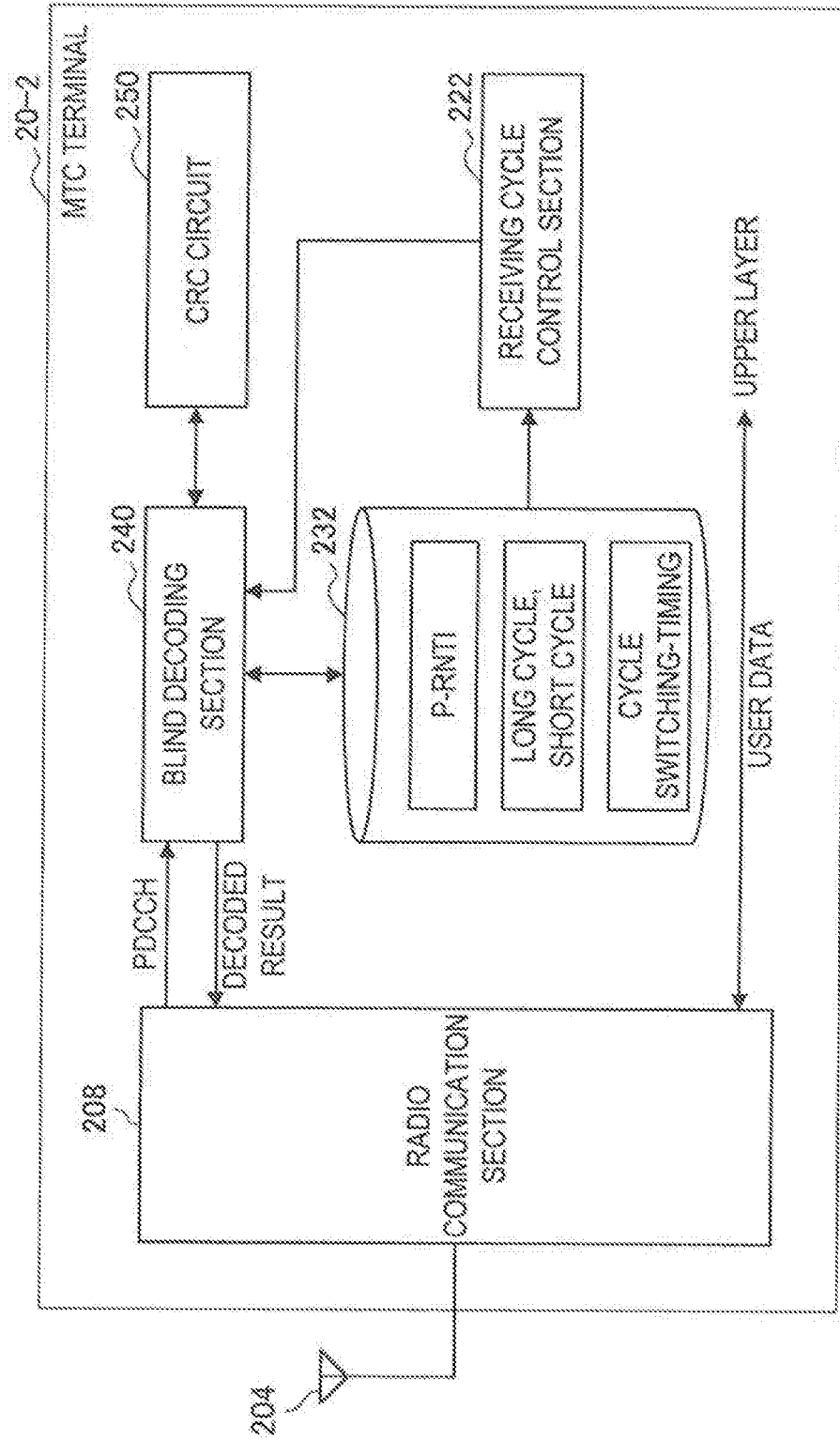
FIG. 11 is a functional block diagram showing a configuration of an MTC terminal of the second embodiment of the invention.

FIG. 11 is a functional block diagram showing the configuration of the MTC terminal 20-2 of the second embodiment. As shown in FIG. 11, the MTC terminal 20-2 of the second embodiment includes an antenna 204, a radio communication section 208, a receiving cycle control section 222, a storage section 232, a blind decoding section 240, and a CRC circuit 250. Functions of the antenna 204, the radio communication section 208, the blind decoding section 240, and the CRC circuit 250 are as described in the first embodiment, so hereinbelow, configurations differing from the first embodiment will primarily be described.

The storage section 232 stores various types of information used in a communication with the base station 10-2. For example, the storage section 232 stores the P-RNTI allotted to the MTC terminal 20-2 by the P-RNTI managing section 116 of the base station 10-2, and the long cycle, the short cycle, the cycle switching-timing and the like that are set by the paging cycle managing section 121 of the base station 10-2.

The receiving cycle control section 222 is a receipt control section that controls a receiving cycle (DRX cycle) for monitoring paging in an RRC_Idle mode. More specifically, the receiving cycle control section 222 causes the blind decoding section 240 to perform blind decoding with radio frames in accordance with the long cycle, the short cycle, and the cycle switching-timing stored in the storage section 232.

As described above, the MTC terminal 20-2 of the second embodiment can switch the receiving cycle among a plurality of cycles at the cycle switching-timing set by the base station 10-2. Notably, although an example in which the base station 10-2 sets the cycle switching-timing and notifies the same to the MTC terminal 20-2 is described above, the MTC terminal 20-2 may set the cycle switching-timing and notify the same to the base station 10-2. Further, in the case where the plurality of cycles such as the long cycle and the short cycle is shared between the base station 10-2 and each MTC terminal 20-2 in advance, the base station 10-2 does not have to notify the long cycle and the short cycle.
(Operation of the Second Embodiment)

In the above, the configurations of the base station 10-2 and the MTC terminal 20-2 of the second embodiment of the invention are described. Next, the operation of the second embodiment of the invention will be described with reference to FIG. 12.

Figure 12:
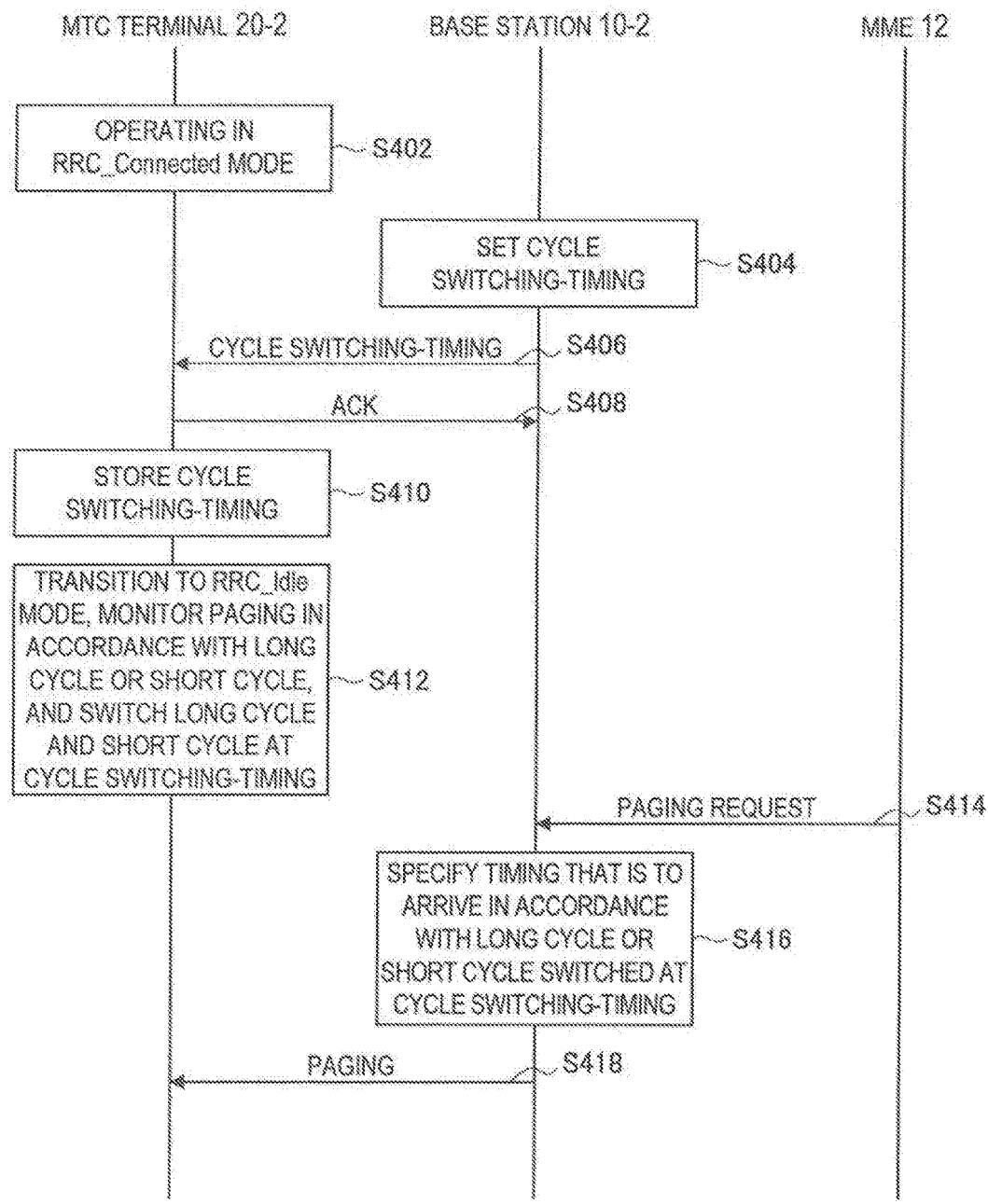
FIG. 12 is a sequence diagram showing an operation of the second embodiment of the invention.

FIG. 12 is a sequence diagram showing the operation of the second embodiment of the invention. As shown in FIG. 12, in a state where the MTC terminal 20-2 is operating in an RRC_Connected mode (S402), when the base station 10-2 sets the cycle switching-timing (S404), the base station 10-2 notifies the cycle switching-timing to the MTC terminal 20-2 (S406).

The MTC terminal 20-2 sends an ACK responsive to the notification of the cycle switching-timing to the base station 10-2 (S408), and stores the cycle switching-timing in the storage section 232 (S410). Notably, the base station 10-2 may notify the plurality of cycles such as the long cycle and the short cycle, in addition to the cycle switching-timing.

Thereafter, when the MTC terminal 20-2 transitions to the RRC_Idle mode, the receiving cycle control section 222 monitors paging in accordance with the long cycle or the short cycle, and switches the long cycle and the short cycle at the cycle switching-timing stored in the storage section 232 (S412).

On the other hand, when the paging request is supplied from an MME 12 via an S1-MME interface (S414), the base station 10-2 specifies a timing that is to arrive in accordance with the long cycle or the short cycle that is switched at the cycle switching-timing set in S404 (S416), and performs paging at the specified timing (S418). Here, since the MTC terminal 20-2 is monitoring paging by switching the long cycle and the short cycle at the same cycle switching-timing as the base station 10-2, the paging from the base station 10-2 can be acquired.

2-3. Third Embodiment

In the above, the second embodiment of the invention was described. Next, the third embodiment of the invention will be described. According to the third embodiment of the invention, as will be described below, a paging cycle can be sequentially updated.
(Configuration of Base Station of the Third Embodiment)

Figure 13:
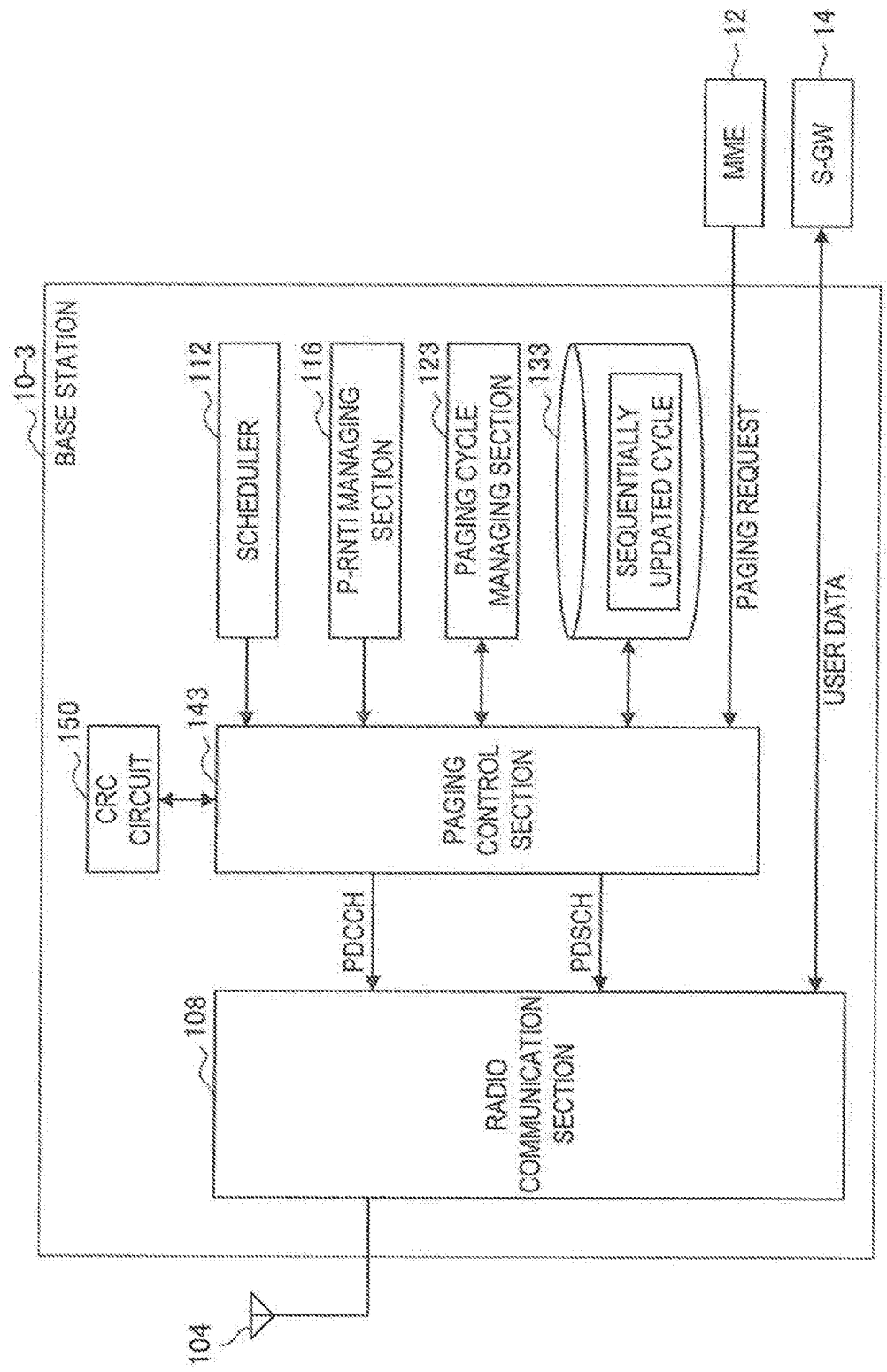
FIG. 13 is a functional block diagram showing a configuration of a base station of a third embodiment of the invention.

FIG. 13 is a functional block diagram showing the configuration of a base station 10-3 of the third embodiment of the invention. As shown in FIG. 13, the base station 10-3 of the third embodiment of the invention includes an antenna 104, a radio communication section 108, a scheduler 112, a P-RNTI managing section 116, a paging cycle managing section 123, a storage section 133, a paging control section 143, and a CRC circuit 150. Functions of the antenna 104, the radio communication section 108, the scheduler 112, the P-RNTI managing section 116, and the CRC circuit 150 are as described in the first embodiment, so hereinbelow, configurations that differ from the first embodiment will primarily be described.

The paging cycle managing section 123 sequentially updates the paging cycle for paging an MTC terminal 20-3 operating in an RRC_Idle mode. For example, the paging cycle managing section 123 updates the paging cycle to a cycle B when the paging cycle is of a cycle A.

The storage section 133 stores the paging cycle (sequentially updated cycle) sequentially updated by the paging cycle managing section 123.

The paging control section 143 controls the paging to the MTC terminal 20-3 in the RRC_Idle mode with radio frames in accordance with the sequentially updated cycle stored in the storage section 133. Here, although the paging cycle updated by the paging cycle managing section 123 needs to be notified to the MTC terminal 20-3 as well, as a notification method of the paging cycle, a first notification method described with reference to FIG. 14 and a second notification method described with reference to FIG. 15 may be exemplified.

Figure 14:
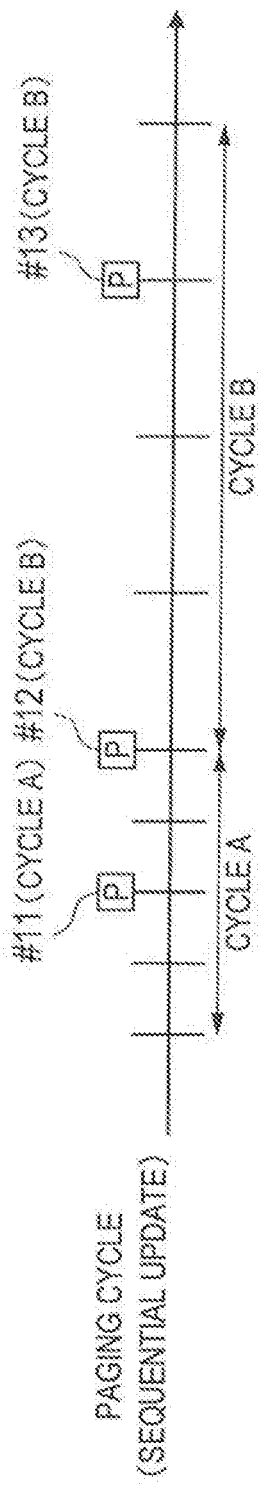
FIG. 14 is an explanatory diagram showing a first notification method of a paging cycle.
Figure 15:
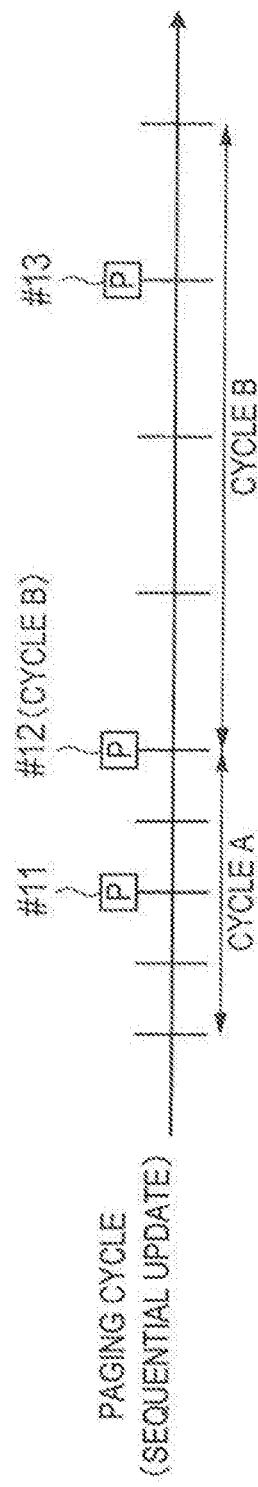
FIG. 15 is an explanatory diagram showing a second notification method of the paging cycle.

FIG. 14 is an explanatory diagram showing the first notification method of the paging cycle. As the first notification method, the base station 10-3 may notify the paging cycle as below in all of paging channels. For example, as shown in FIG. 14, the base station 10-3 may notify the cycle A in a paging channel #11 where the cycle A continues to take place thereafter, and may notify the cycle B in a paging channel #12 where the paging cycle is to be updated to the cycle B thereafter FIG. 15 is an explanatory diagram showing the second notification method of the paging cycle. As the second notification method, the base station 10-3 may notify the updated paging cycle in the paging channel where the paging cycle is to be updated thereafter. For example, as shown in FIG. 15, the base station 10-3 may not notify the paging cycle in the paging channel #11 where the cycle A continues to take place thereafter, and may notify the cycle B in the paging channel #12 in which the paging cycle is updated to the cycle B.

As described above, according to the third embodiment of the invention, it is possible to sequentially update the paging cycle related to the MTC terminal 20-3 operating in the RRC_Idle mode responsive to an update request of the paging cycle on a network side including the base station 10-3. Further, according to the third embodiment of the invention, since there is no need to share an acyclic pattern configured of a plurality of intervals as in the first embodiment, it is advantageous in the viewpoint of memory resources. Further, especially the second notification method is effective in that it can suppress resources for the notification.
(Configuration of MTC Terminal of the Third Embodiment)

Next, the configuration of the MTC terminal 20-3 of the third embodiment will be described with reference to FIG. 16.

Figure 16:
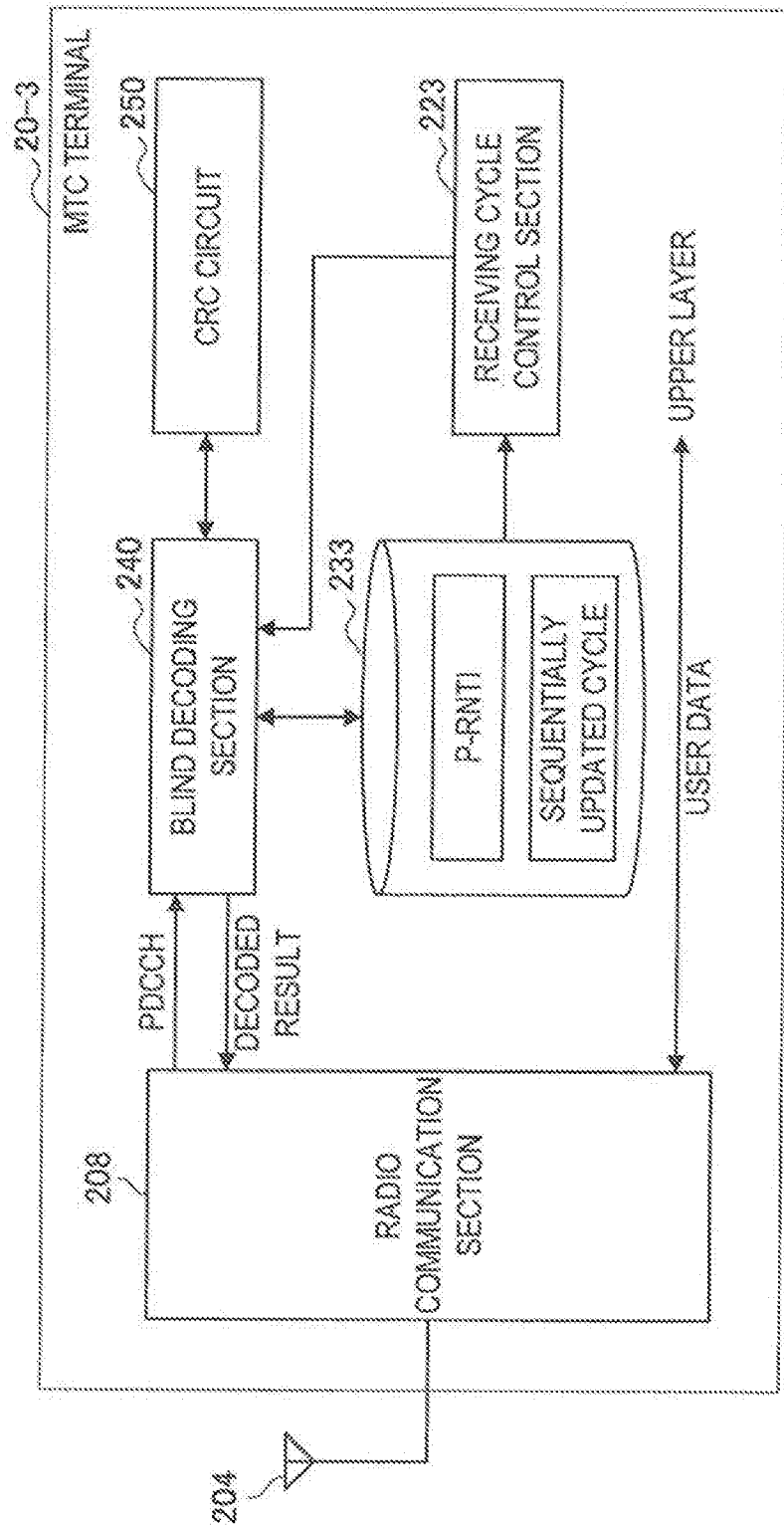
FIG. 16 is a functional block diagram showing a configuration of an MTC terminal of the third embodiment of the invention.

FIG. 16 is a functional block diagram showing the configuration of the MTC terminal 20-3 of the third embodiment. As shown in FIG. 16, the MTC terminal 20-3 of the third embodiment includes an antenna 204, a radio communication section 208, a receiving cycle control section 223, a storage section 233, a blind decoding section 240, and a CRC circuit 250. Functions of the antenna 204, the radio communication section 208, the blind decoding section 240, and the CRC circuit 250 are as described in the first embodiment, so hereinbelow, configurations differing from the first embodiment will primarily be described.

The storage section 233 stores various types of information used in a communication with the base station 10-3. For example, the storage section 233 stores a P-RNTI allotted to the MTC terminal 20-3 by a P-RNTI managing section 116 of the base station 10-3, and a paging cycle that is sequentially updated by a paging cycle managing section 121 of the base station 10-3, and the like.

The receiving cycle control section 223 is a receipt control section that controls a receiving cycle (DRX cycle) for monitoring paging in an RRC_Idle mode. More specifically, the receiving cycle control section 223 causes the blind decoding section 240 to perform blind decoding with radio frames in accordance with the sequentially updated paging cycle stored in the storage section 233.

As described above, the MTC terminal 20-3 of the third embodiment can monitor the paging in accordance with the paging cycle that is sequentially updated by the base station 10-3.

(Operation of the Third Embodiment)

In the above, the configurations of the base station 10-3 and the MTC terminal 20-3 of the third embodiment of the invention were described. Next, the operation of the third embodiment of the invention will be described with reference to FIG. 17.

Figure 17:
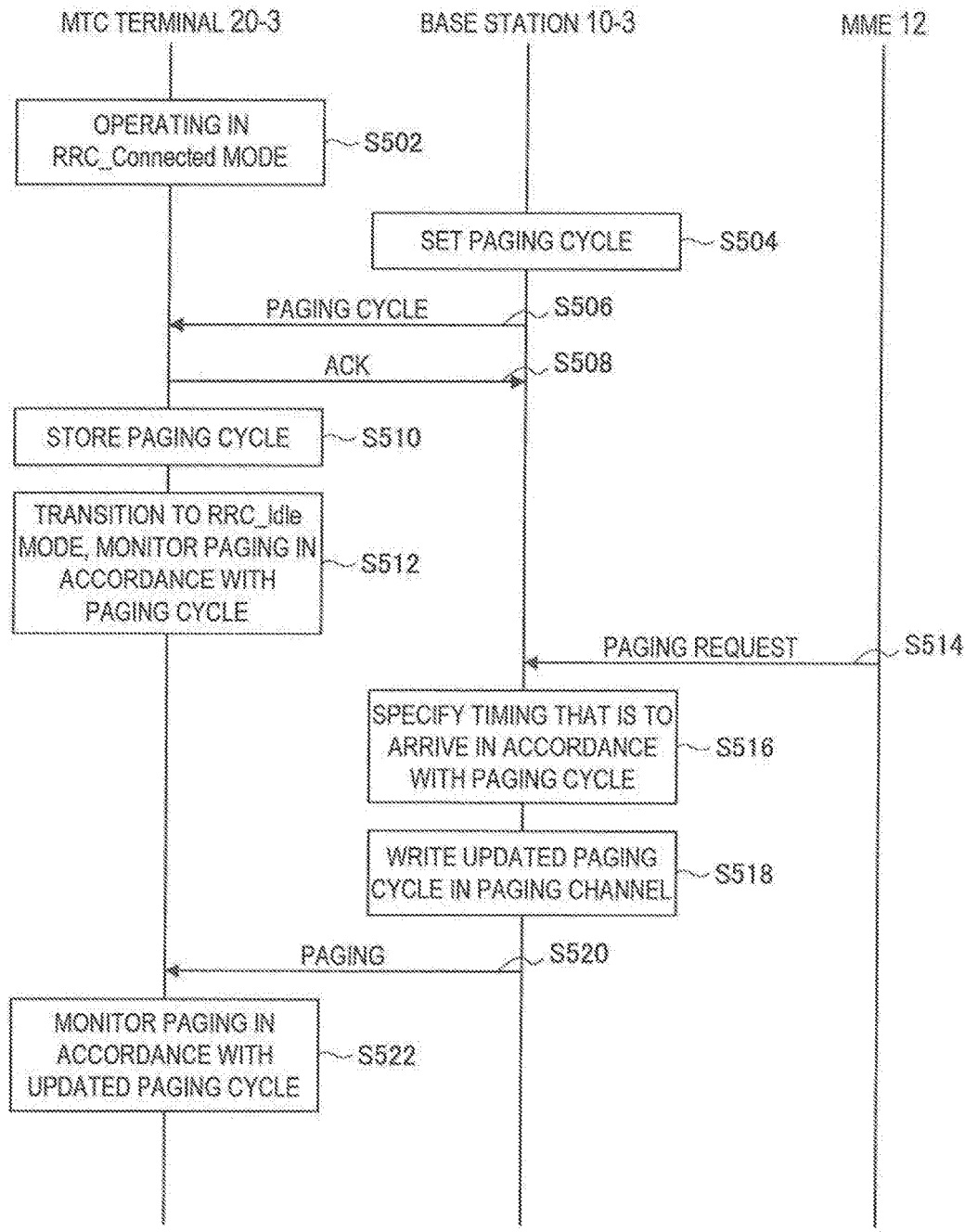
FIG. 17 is a sequence diagram showing an operation of the third embodiment of the invention.

FIG. 17 is a sequence diagram showing an operation of the third embodiment of the invention. As shown in FIG. 17, in a state where the MTC terminal 20-3 is operating in an RRC_Connected mode (S502), when the base station 10-3 sets the paging cycle (S504), the base station 10-3 notifies the paging cycle to the MTC terminal 20-3 (S506).

The MTC terminal 20-3 sends an ACK responsive to the notification of the paging cycle to the base station 10-3 (S508), and stores the paging cycle in the storage section 233 (S510).

Thereafter, when the MTC terminal 20-3 transitions to the RRC_Idle mode, the receiving cycle control section 223 monitors paging in accordance with the paging cycle stored in the storage section 233 (S512).

On the other hand, when the paging request is supplied from an MME 12 via an S1-MME interface (S514), the base station 10-3 specifies a timing that is to arrive in accordance with the paging cycle set in S504 (S516). Further, in the case of updating the paging cycle, the base station 10-3 writes an updated paging cycle in the paging channel (S518). Then, the base station 10-3 performs paging at the timing specified in S516 by the paging channel in which the updated paging cycle is written (S520).

When the paging channel in which the updated paging cycle is written is received, the MTC terminal 20-3 stores the updated paging cycle in the storage section 233, and monitors the paging in accordance with the updated paging cycle (S522).

Here, in the embodiment in which the base station 10-3 sequentially updates the paging cycle and notifies the same to the MTC terminal 20-3 as described above, it is important for the base station 10-3 to know whether the notification of the updated paging cycle has been correctly received by the MTC terminal 20-3 or not. However, if the MTC terminal 20-3 sends a receipt confirmation by an uplink, there is a problem that signaling is increased.

Due to this, the base station 10-3 of the embodiment solves the above problem by a method described hereinbelow with reference to FIG. 18.

Figure 18:
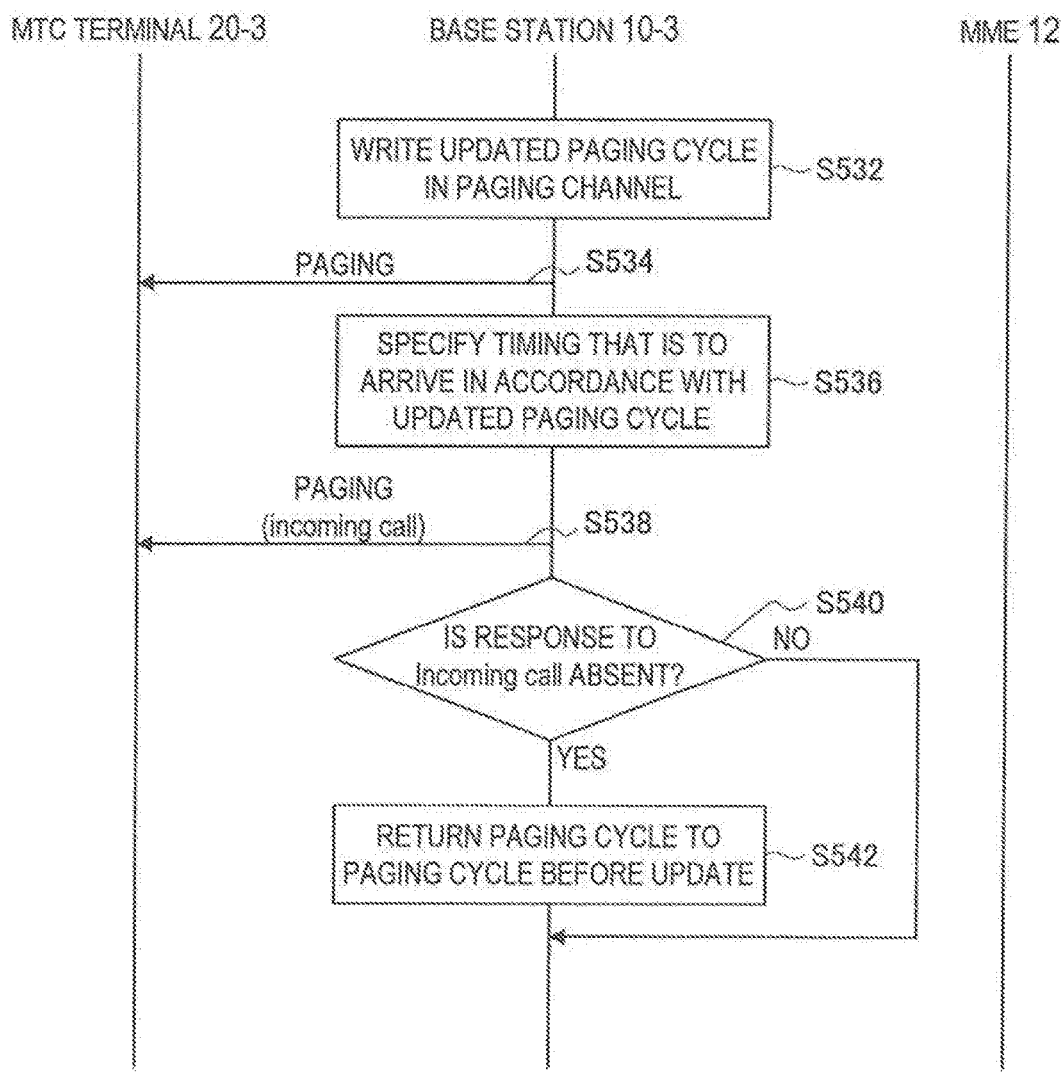
FIG. 18 is a sequence diagram showing an operation of the third embodiment of the invention.

FIG. 18 is a sequence diagram showing an operation of the third embodiment. As shown in FIG. 18, in the case of updating the paging cycle, the base station 10-3 performs paging by writing the updated paging cycle in the paging channel (S532, S534). Thereafter, the base station 10-3 transitions to the updated paging cycle, and in a case where a terminal is called by an incoming call in a first paging channel (S536, S538), it determines presence and absence of a response from the MTC terminal 20-3 to the incoming call (S540).

Here, if the response was not made from the MTC terminal 20-3, a reason thereof may be due to the MTC terminal 20-3 not being able to correctly receive the notification of the updated paging cycle, and the monitoring of the paging is continued in accordance with the paging cycle before the update. Thus, in the case where the response to the incoming call was not made from the MTC terminal 20-3, the base station 10-3 returns the paging cycle to the paging cycle before the update (S542). According to such a configuration, the base station 10-3 becomes capable of performing the paging at a cycle that is monitored by the MTC terminal 20-3.

2-4. Fourth Embodiment

In the above, the first to third embodiments of the invention were described. Next, before describing the fourth embodiment of the invention, how the fourth embodiment of the invention had been made will be described.

In a case where a paging cycle of a UE of an RRC_Idle mode is of a long cycle, such as ten days or one month, a state of the UE may change among the cycle intervals. However, it had been difficult to change the paging cycle in accordance with this change in the state. Although performing signaling for changing the paging cycle by the UE transitioning to an RRC_Connected mode and performing synchronization with an eNodeB may be considered, such a method was problematic in that power is consumed therein.

The fourth embodiment of the invention, and a fifth embodiment to be described below are made by focusing on the above matter. An MTC terminal 20-4 of the fourth embodiment of the invention is capable of changing the paging cycle in accordance with the change in the state while maintaining the RRC_Idle mode. Hereinbelow, such a fourth embodiment of the invention will be described in detail.

(Configuration of Base Station of the Fourth Embodiment)

Figure 19:
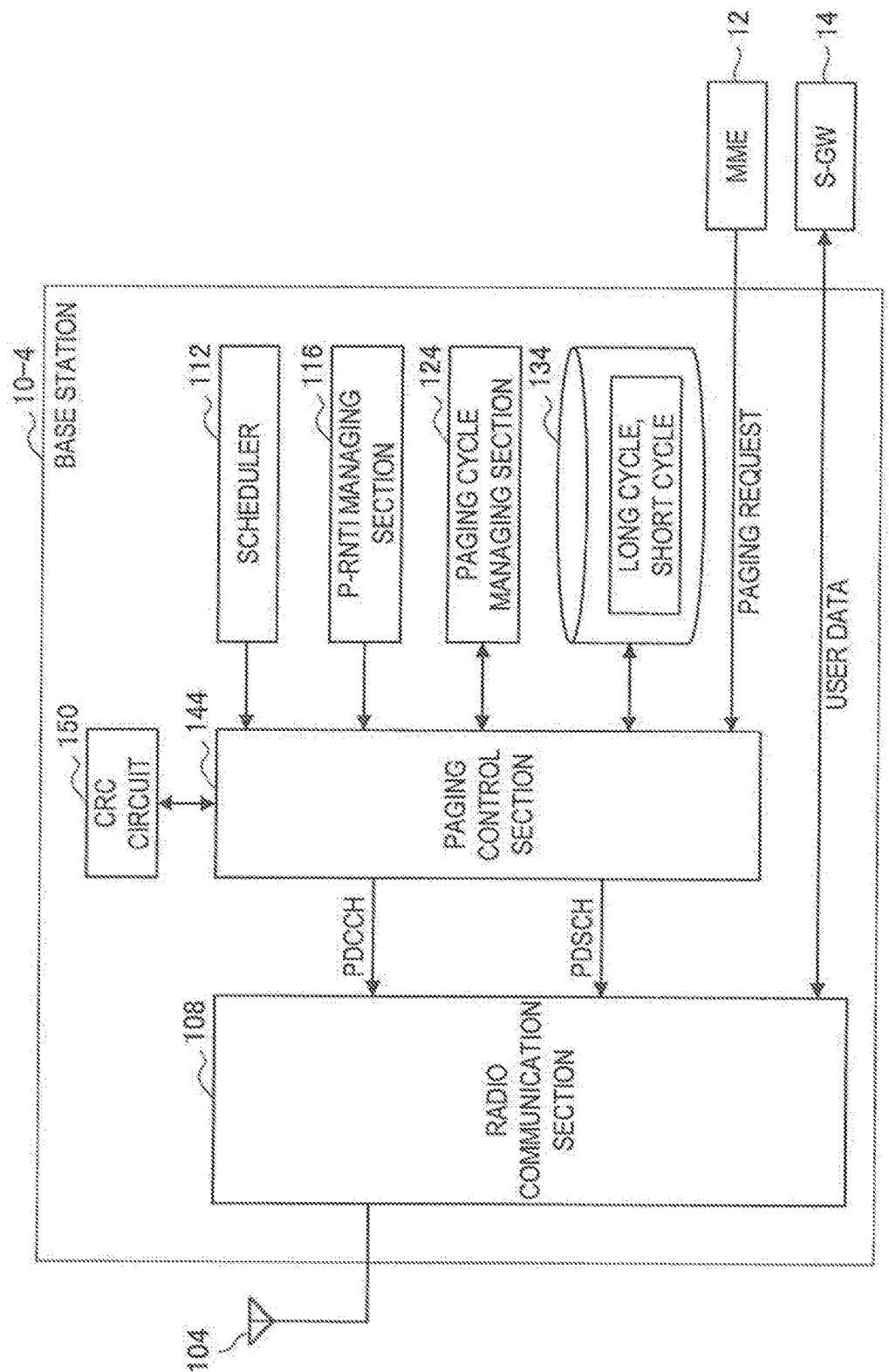
FIG. 19 is a functional block diagram showing a configuration of a base station of a fourth embodiment of the invention.

FIG. 19 is a functional block diagram showing a configuration of a base station 10-4 of the fourth embodiment of the invention. As shown in FIG. 19, the base station 10-4 of the fourth embodiment of the invention includes an antenna 104, a radio communication section 108, a scheduler 112, a P-RNTI managing section 116, a paging cycle managing section 124, a storage section 134, a paging control section 144, and a CRC circuit 150. Functions of the antenna 104, the radio communication section 108, the scheduler 112, the P-RNTI managing section 116, and the CRC circuit 150 are as described in the first embodiment, so hereinbelow, configurations that differ from the first embodiment will primarily be described.

The paging cycle managing section 124 sets a plurality of cycles for paging to each MTC terminal 20-4 operating in the RRC_Idle mode. For example, the paging cycle managing section 124 sets a long cycle and a short cycle.

The storage section 134 stores information indicating the plurality of cycles (the long cycle and the short cycle) of each MTC terminal 20-4 set by the paging cycle managing section 124.

The paging control section 144 controls the paging to the MTC terminal 20-4 in the RRC_Idle mode by radio frames in accordance with each of the plurality of cycles stored in the storage section 134 in connection to the MTC terminal 20-4. Hereinbelow, this respect will be described in detail with reference to FIG. 20.

Figure 20:
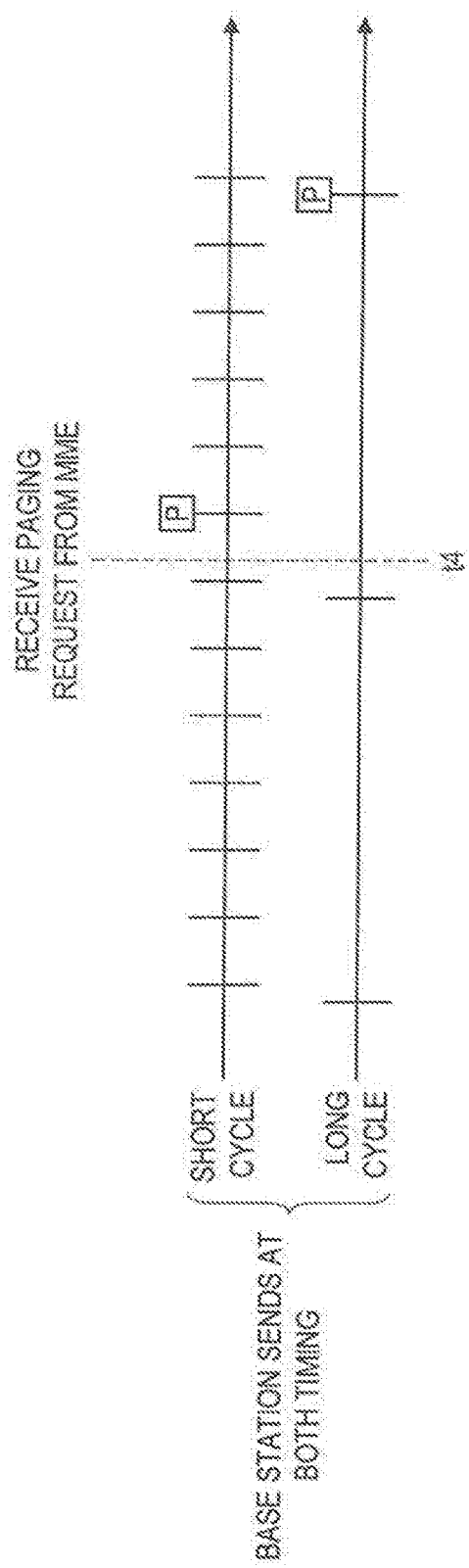
FIG. 20 is an explanatory diagram showing a specific example of paging by the base station of the fourth embodiment of the invention.

FIG. 20 is an explanatory diagram showing a specific example of the paging by the base station 10-4. The long cycle and the short cycle are stored in the storage section 134 in connection to the MTC terminal 20-4, and a case in which the base station 10-4 receives a paging request to the MTC terminal 20-4 from an MME 12 at t4 as shown in FIG. 20 will be considered. In this case, as shown in FIG. 20, the paging cycle managing section 124 of the base station 10-4 performs the paging to the MTC terminal 20-4 at both a timing in accordance with the short cycle and a timing in accordance with the long cycle.

(Configuration of MTC Terminal of the Fourth Embodiment)

Next, a configuration of the MTC terminal 20-4 of the fourth embodiment will be described with reference to FIG. 21.

Figure 21:
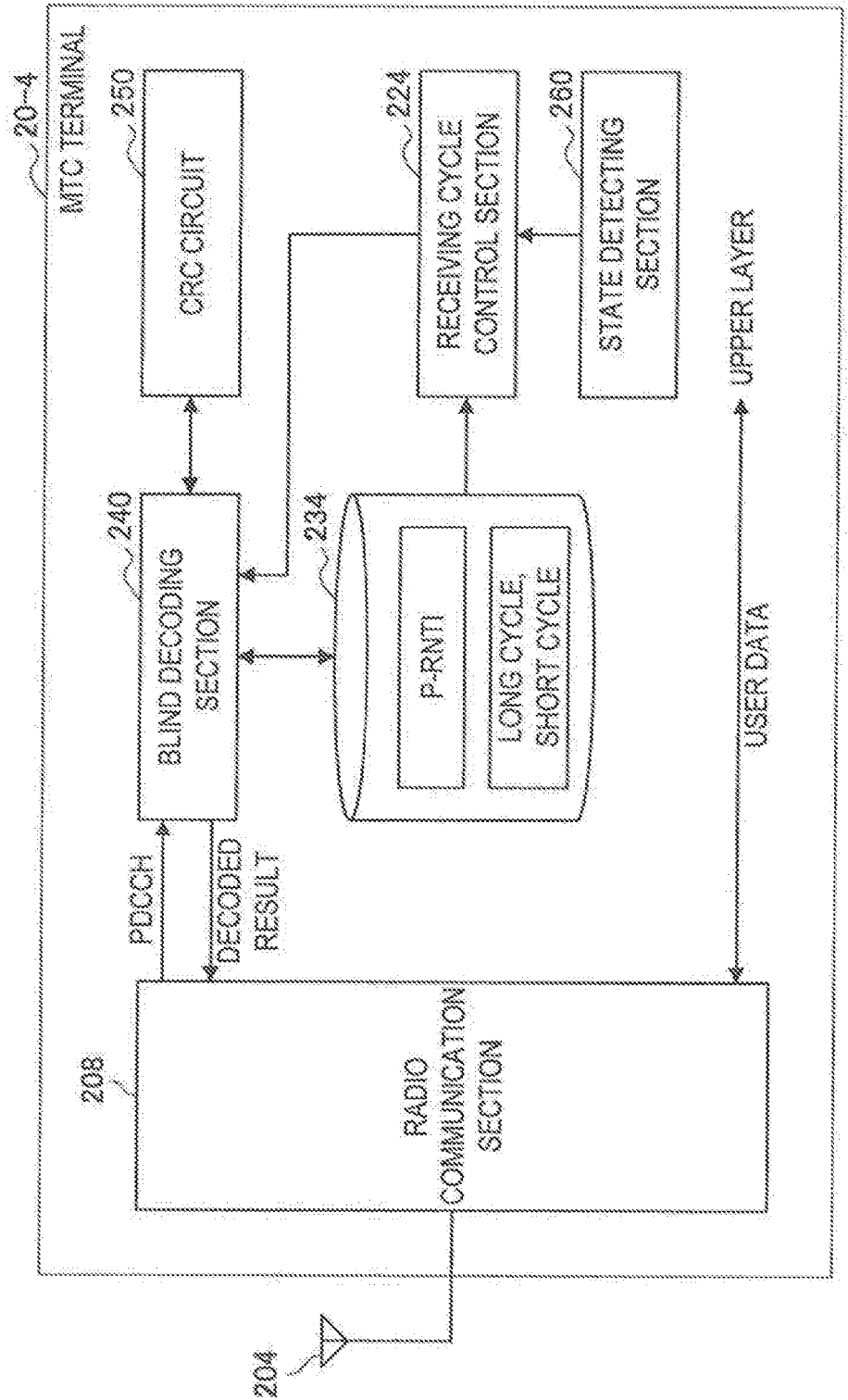
FIG. 21 is a functional block diagram showing a configuration of an MTC terminal of the fourth embodiment of the invention.

FIG. 21 is a functional block diagram showing the configuration of the MTC terminal 20-4 of the fourth embodiment. As shown in FIG. 21, the MTC terminal 20-4 of the fourth embodiment includes an antenna 204, a radio communication section 208, a receiving cycle control section 224, a storage section 234, a blind decoding section 240, a CRC circuit 250, and a state detecting section 260. Functions of the antenna 204, the radio communication section 208, the blind decoding section 240, and the CRC circuit 250 are as described in the first embodiment, so hereinbelow, configurations differing from the first embodiment will primarily be described.

The storage section 234 stores various types of information used in a communication with a base station 10-4. For example, the storage section 234 stores a P-RNTI allotted to the MTC terminal 20-4 by a P-RNTI managing section 116 of the base station 10-4, and a long cycle, a short cycle and the like set by a paging cycle managing section 124 of the base station 10-4.

The state detecting section 260 detects a state change of the MTC terminal 20-4. For example, the state detecting section 260 may be a velocity sensor or a GPS that detects a movement of the MTC terminal 20-4, or that the MTC terminal 20-4 has moved to a predetermined position as the state change.

Further, the state detecting section 260 may detect a decrease in remaining power of the MTC terminal 20-4 (for example, detect that the remaining power has gone below a threshold) as the state change. Further, in a case where the MTC terminal 20-4 is mounted to an apparatus having a function of a vending machine of products, the state detecting section 260 may detect change in sales by the vending machine function or a decrease in product stocks as the state change.

The receiving cycle control section 224 is a receipt control section that controls a receiving cycle (DRX cycle) for monitoring paging in the RRC_Idle mode. Here, if the state of the MTC terminal 20-4 had not at all changed despite data report (read) order is included in the paging channel from the base station 10-4, there may be cases in which useful information cannot be obtained from the MTC terminal 20-4. For example, in a case where the MTC terminal 20-4 is mounted on a vending machine for canned juice, and the base station 10-4 requests a report of stocks from the MTC terminal 20-4 for the purpose of replenishing the canned juice, a meaning to have the MTC terminal 20-4 report the stocks is small if the stocks have not changed at all.

On the other hand, if the state of the MTC terminal 20-4 has changed, it is assumed that a value to have the MTC terminal 20-4 report data by paging is increased. Due to this, in the case where the state of the MTC terminal 20-4 has changed, it is preferable to make a receiving cycle short. However, normally, since a connection is not established when the MTC terminal 20-4 is operating in the RRC_Idle mode, it had been difficult to change the receiving cycle by a communication with the base station 10-4.

In regards to this feature, the receiving cycle control section 224 of the MTC terminal 20-4 of the embodiment switches the receiving cycle between the long cycle and the short cycle depending on a detection of the state change by the state detecting section 260. Even if the MTC terminal 20-4 one sidedly changes the receiving cycle for paging as above, since the base station 10-4 of the embodiment performs the paging to the MTC terminal 20-4 at both the timing in accordance with the short cycle and the timing in accordance with the long cycle as described above with reference to FIG. 20, the MTC terminal 20-4 can receive the paging from the base station 10-4. Hereinbelow, this feature will be described more specifically with reference to FIG. 22.

Figure 22:
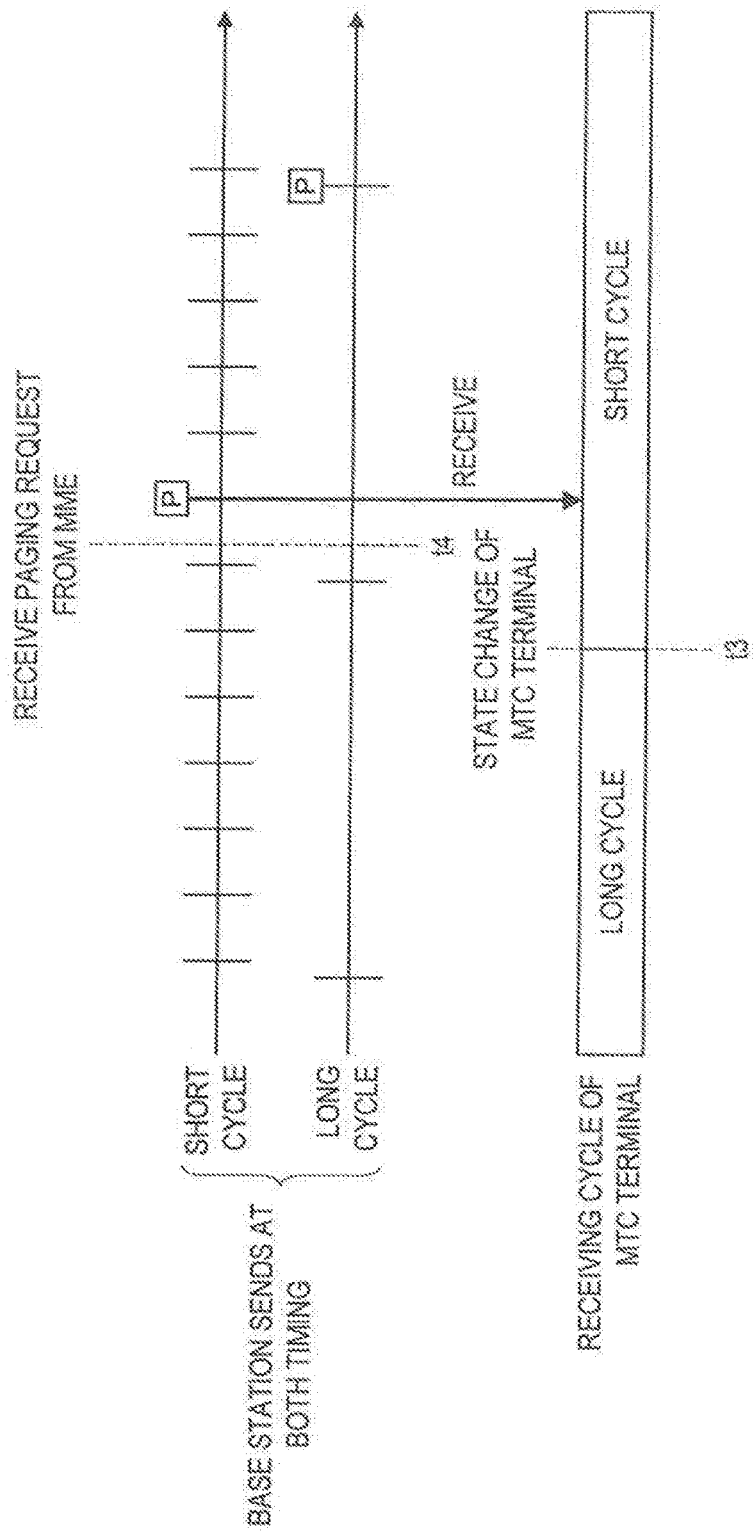
FIG. 22 is an explanatory diagram showing a switch of a receiving cycle by the MTC terminal of the fourth embodiment of the invention.

FIG. 22 is an explanatory diagram showing switching of the receiving cycle by the MTC terminal 20-4. As shown in FIG. 22, in a case where the state change is detected by the state detecting section 260 at t3, the receiving cycle control section 224 of the MTC terminal 20-4 switches the receiving cycle from the long cycle to the short cycle. On the other hand, in a case where the paging request is received from the MME 12 at t4, the base station 10-4 performs the paging at both the timing in accordance with the short cycle and the timing in accordance with the long cycle. Due to this, the MTC terminal 20-4 can receive the paging that is performed at the timing in accordance with the short cycle from the base station 10-4 after having switched the receiving cycle.

Here, a specific example of a criterion of the switch of the receiving cycle by the receiving cycle control section 224 will be described. For example, in an application for tracking by the MTC terminal 20-4 to monitor a location where a cargo is, no new information can be obtained even if the MTC terminal 20-4 is made to report the location when no transportation of the cargo is taking place. Thus, the MTC terminal 20-4 monitors in accordance with the long cycle when there is no transportation of the cargo, and reports the same positional information. On the other hand, when the cargo has moved, the receiving cycle control section 224 of the MTC terminal 20-4 switches the receiving cycle to the short cycle. Due to this, a response to a call becomes quicker, and it becomes possible to obtain reports of useful information such as positional information after the transportation or during the transportation with a shorter response time. Due to the same reason, the receiving cycle control section 224 of the MTC terminal 20-4 may switch the receiving cycle to the short cycle when the cargo has moved to a specific location.

Further, in a case where remaining power of the MTC terminal 20-4 has decreased, the receiving cycle control section 224 of the MTC terminal 20-4 may switch the receiving cycle from the short cycle to the long cycle. According to such a configuration, a decreasing speed of the remaining power of the MTC terminal 20-4 can be suppressed.

Further, in a case where sales by the vending machine function is obtained, or in a case where stocks of the products becomes short, the receiving cycle control section 224 of the MTC terminal 20-4 may switch the receiving cycle from the long cycle to the short cycle. According to such a configuration, the network side can acquire useful information with less delay.

(Operation of the Fourth Embodiment)

In the above, the configurations of the base station 10-4 and the MTC terminal 20-4 of the fourth embodiment of the invention were described. Next, the operation of the fourth embodiment of the invention will be described with reference to FIG. 23.

Figure 23:
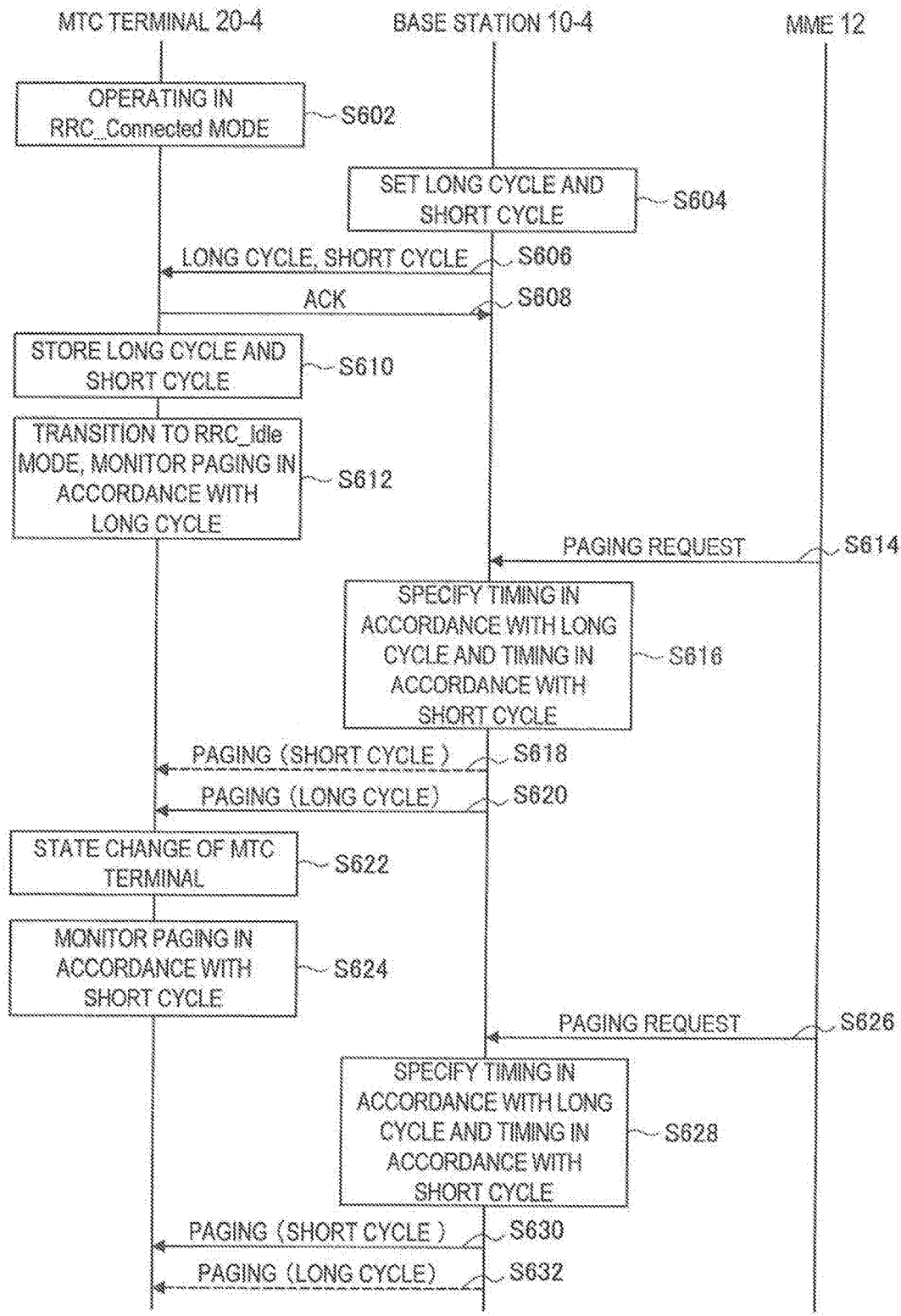
FIG. 23 is a sequence diagram showing an operation of the fourth embodiment of the invention.

FIG. 23 is a sequence diagram showing an operation of the fourth embodiment of the invention. As shown in FIG. 23, in the state in which the MTC terminal 20-4 is operating in the RRC_Connected mode (S602), the base station 10-4 sets the long cycle and the short cycle (S604), and notifies the long cycle and the short cycle to the MTC terminal 20-4 (S606).

The MTC terminal 20-4 returns an ACK to the base station 10-4 in response to the notification of the long cycle and the short cycle (S608), and stores information indicating the long cycle and the short cycle in the storage section 234 (S610).

Thereafter, when the MTC terminal 20-4 transitions to the RRC_Idle mode, the receiving cycle control section 224 monitors paging in accordance with the long cycle stored in the storage section 234 (S612). Notably, the receiving cycle control section 224 may set the receiving cycle just after having transitioned to the RRC_Idle mode in the short cycle.

On the other hand, when the paging request is supplied from the MME 12 via the S1-MME interface (S614), the base station 10-4 specifies a timing in accordance with the long cycle and a timing in accordance with the short cycle (S616), and performs paging at both of the timings (S618, S620). Here, since the MTC terminal 20-4 is monitoring the paging in accordance with the long cycle, it can acquire the paging at the timing according to the long cycle (S620).

Thereafter, in the case where the state change is detected by the state detecting section 260 (S622), the receiving cycle control section 224 of the MTC terminal 20-4 switches the receiving cycle from the long cycle to the short cycle (S624).

Then, when the paging request is supplied from the MME 12 via the S1-MME interface (S626), the base station 10-4 specifies the timing in accordance with the long cycle and the timing in accordance with the short cycle (S628), and performs the paging at both of the timings (S630, S632). Here, since the MTC terminal 20-4 is monitoring the paging in accordance with the short cycle, it can acquire the paging at the timing according to the short cycle (S630).

2-5. Fifth Embodiment

In the above, the fourth embodiment of the invention was described. Next, the fifth embodiment of the invention will be described. The fifth embodiment of the invention is made in view of the same problem as the fourth embodiment of the invention, and an MTC terminal 20-5 of the fifth embodiment of the invention is capable of changing a paging cycle in accordance with a state change while maintaining an RRC_Idle mode. Hereinbelow, such a fifth embodiment of the invention will be described in detail. Notably, functional blocks of the MTC terminal 20-5 of the fifth embodiment can be configured substantially identical to the functional blocks of the MTC terminal 20-4 of the fourth embodiment, so a detailed description thereof will be omitted.

(Configuration of Base Station of the Fifth Embodiment)

Figure 24:
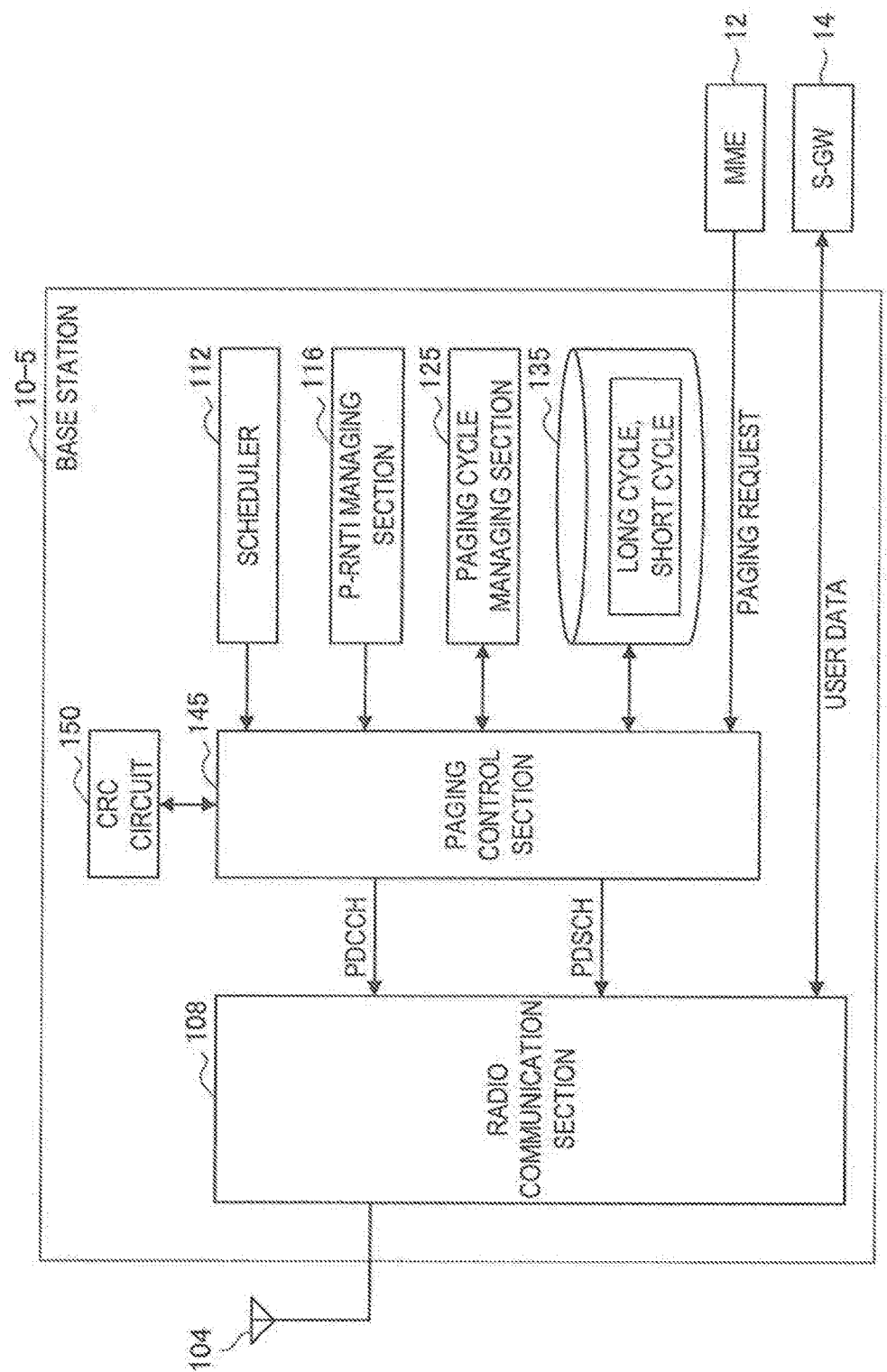
FIG. 24 is a functional block diagram showing a configuration of a base station of a fifth embodiment of the invention.

FIG. 24 is a functional block diagram showing the configuration of a base station 10-5 of the fifth embodiment of the invention. As shown in FIG. 24, the base station 10-5 of the fifth embodiment of the invention includes an antenna 104, a radio communication section 108, a scheduler 112, a P-RNTI managing section 116, a paging cycle managing section 125, a storage section 135, a paging control section 145, and a CRC circuit 150. Functions of the antenna 104, the radio communication section 108, the scheduler 112, the P-RNTI managing section 116, and the CRC circuit 150 are as described in the first embodiment, so hereinbelow, configurations that differ from the first embodiment will primarily be described.

The paging cycle managing section 125 sets a plurality of cycles for paging each MTC terminal 20-5 operating in an RRC_Idle mode. For example, the paging cycle managing section 125 sets a long cycle and a short cycle.

The storage section 135 stores information indicating the plurality of cycles (long cycle and short cycle) of each MTC terminal 20-5 set by the paging cycle managing section 125.

The paging control section 145 controls the paging to the MTC terminal 20-5 in the RRC_Idle mode by radio frames in accordance with one of the plurality of cycles stored in the storage section 135 in connection to the MTC terminal 20-5.

Here, the MTC terminal 20-5 of the fifth embodiment switches a receiving cycle for the paging according to the state change of the MTC terminal 20-5, similar to the fourth embodiment. On the other hand, a base station 10-5 performs paging in accordance with a cycle before the switch by the MTC terminal 20-5, even after the switch of the receiving cycle by the MTC terminal 20-5. Due to this, since the MTC terminal 20-5 cannot receive the paging, the base station 10-5 cannot receive a response to the paging from the MTC terminal 20-5.

Thus, in a case where the response to the paging cannot be obtained from the MTC terminal 20-5, the base station 10-5 determines that the MTC terminal 20-5 has switched the receiving cycle, and switches the paging cycle for the MTC terminal 20-5. Hereinbelow, this feature will be described specifically with reference to FIG. 25 and FIG. 26.

FIG. 25 is an explanatory diagram showing a switch of the paging cycle by the base station 10-5. As shown in FIG. 25, in a case where the MTC terminal 20-5 is monitoring the paging in the long cycle, and when the base station 10-5 sends a paging #21 in accordance with the long cycle, the MTC terminal 20-5 receives this paging #21.

Thereafter, when the MTC terminal 20-5 switches to the short cycle by the state change at t5, the MTC terminal 20-5 can no longer receive a paging #22 that the base station 10-5 sends in accordance with the long cycle. Due to this, the paging control section 145 of the base station 10-5 determines that the MTC terminal 20-5 has switched the receiving cycle since a response to the paging #22 cannot be obtained, switches the paging cycle to the short cycle and sends a paging #22'. Since the MTC terminal 20-5 is monitoring the paging in accordance with the short cycle, it is possible to receive this paging #22'.

Accordingly, in the case where the base station 10-5 switches the paging cycle from the long cycle to the short cycle, although time from being called to the response will not be shortened, since the paging is sent in accordance with the long cycle until when it is necessary, there is an advantage in that resources for the paging can be saved.

Notably, normally a plurality of MTC terminals 20-5 belongs to one P-RNTI. Further, the plurality of MTC terminals 20-5 belonging to the same P-RNTI may include both MTC terminals 20-5 operating in the long cycle and MTC terminals 20-5 operating in the short cycle. Due to this, the base station 10-5 may perform the paging to different MTC terminals 20-5 by using the same P-RNTI at both the timing in accordance with the short cycle and the timing in accordance with the long cycle.

Further, in a case where each of timings that arrives in accordance with the long cycle is identical to the timing that arrives in accordance with the short cycle, the MTC terminal 20-5 can receive the paging sent in accordance with the long cycle even after having switched to the short cycle in regards to the timing. However, in this case, it becomes difficult for the base station 10-5 to determine the switch in the receiving cycle of the MTC terminal 20-5.

Thus, the base station 10-5 may allot a P-RNTI for the long cycle and a P-RNTI for the short cycle to each MTC terminal 20-5, and may use the P-RNTI for the long cycle upon performing the paging in accordance with the long cycle, and the P-RNTI for the short cycle upon performing the paging in accordance with the short cycle. Further, the MTC terminal 20-5 may perform blind decoding using the P-RNTI for the long cycle upon monitoring the paging in the long cycle, and perform the blind decoding using the P-RNTI for the short cycle upon monitoring the paging in the short cycle. According to such a configuration, it becomes possible for the base station 10-5 to determine the switch in the receiving cycle of the MTC terminal 20-5 at a high accuracy.

In the above, although an example in which the paging cycle (receiving cycle) is switched from the long cycle to the short cycle was described, as will be described with reference to FIG. 26, a switch from the short cycle to the long cycle is also possible.

FIG. 26 is an explanatory diagram showing the switch of the paging cycle by the base station 10-5. As shown in FIG. 26, in the case where the paging is monitored in the short cycle, the MTC terminal 20-5 receives a paging #31 when the base station 10-5 sends the paging #31 in accordance with the short cycle.

Thereafter, when the MTC terminal 20-5 switches the receiving cycle to the long cycle at t6 by the state change, a paging #32 that the base station 10-5 sends in accordance with the short cycle can no longer be received by the MTC terminal 20-5. Due to this, the paging control section 145 of the base station 10-5 determines that the MTC terminal 20-5 has switched the receiving cycle since a response to the paging #32 cannot be obtained, switches the paging cycle to the long cycle and sends a paging #32'. Since the MTC terminal 20-5 is monitoring the paging in accordance with the long cycle, it is possible to receive this paging #32'.

Accordingly, by the MTC terminal 20-5 switching the receiving cycle from the short cycle to the long cycle, consumed power of the MTC terminal 20-5 can be reduced. Notably, in this case, although time from being called to responding becomes long, an undesirable influence therefrom is small since the MTC terminal 20-5 switches the monitoring cycle of the paging to the long cycle in cases where no problem is expected even if the response is delayed.

(Operation of the Fifth Embodiment)

In the above, the configurations of the base station 10-5 and the MTC terminal 20-5 of the fifth embodiment of the invention were described. Next, the operation of the fifth embodiment of the invention will be described with reference to FIG. 27.

FIG. 27 is a sequence diagram showing an operation of the fifth embodiment of the invention. As shown in FIG. 27, in a state where the MTC terminal 20-5 is operating in the RRC_Connected mode (S702), the base station 10-5 sets the long cycle and the short cycle (S704), and notifies the long cycle and the short cycle to the MTC terminal 20-5 (S706).

The MTC terminal 20-5 returns an ACK responsive to the notification of the long cycle and the short cycle to the base station 10-5 (S708), and stores information indicating the long cycle and the short cycle in the storage section 234 (S710).

Thereafter, when the MTC terminal 20-5 transitions to the RRC_Idle mode, the receiving cycle control section 224 monitors the paging in accordance with the long cycle stored in the storage section 234 (S712). Notably, the receiving cycle control section 224 may set the receiving cycle just after having transitioned to the RRC_Idle mode in the short cycle.

On the other hand, when a paging request is supplied from the MME 12 via the S1-MME interface (S714), the base station 10-5 specifies a timing in accordance with the long cycle (S716), and performs the paging at the specified timing (S718). Here, since the MTC terminal 20-5 is monitoring the paging in accordance with the long cycle, the paging from the base station 10-5 can be acquired (S720).

Thereafter, in a case where the state change is detected by the state detecting section 260 (S720), the receiving cycle control section 224 of the MTC terminal 20-5 switches the receiving cycle from the long cycle to the short cycle (S722).

Then, when the paging request is supplied from the MME 12 via the S1-MME interface (S724), the base station 10-5 specifies a timing in accordance with the long cycle (S726), and performs the paging at the specified timing (S728). However, since the MTC terminal 20-5 is monitoring the paging in accordance with the short cycle, the base station 10-5 cannot acquire the response to this paging.

Due to this, the paging control section 145 of the base station 10-5 determines that the MTC terminal 20-5 has switched the receiving cycle, and performs the paging by switching the paging cycle to the short cycle (S730, S732). Here, since the MTC terminal 20-5 is monitoring the paging in accordance with the short cycle, the paging sent in S732 can be acquired.

3. CONCLUSION

As described above, according to the first to third and fifth embodiments of the invention, it becomes possible for the base station 10 to perform the paging by switching the plurality of cycles. For example, the base station 10-1 of the first embodiment can perform the paging in accordance with the acyclic pattern in which the end of the months such as 31st, (January), 28th (February), 31st (March), 30th (April), and so on arrives.

Further, since the base station 10-4 of the fourth embodiment of the invention performs the paging in the plurality of cycles, the MTC terminal 20-4 of the fourth embodiment can switch the receiving cycle of the paging for example in accordance with the state change of the MTC terminal 20-4 without having have to communicate with the base station 10-4 in advance.

Notably, although preferred embodiments of the invention have been described in detail with reference to the attached drawings, the invention is not limited to these examples. A person skilled in the art finds various alterations and modifications within the scope of the appended claims, and it should be understood that they will naturally come under the technical scope of the present invention.

For example, respective steps in the processes by the base station 10 and the MTC terminal 20 in the description do not necessarily be performed in chronological orders as described in sequence diagrams. For example, the respective steps in the processes by the base station 10 and the MTC terminal 20 may be performed in orders different from the orders described the in sequence diagrams, or may be performed in parallel.

Further, computer programs for causing hardware such as CPUs, ROMs, and RAMs installed in the base station 10 and the MTC terminal 20 to exhibit similar functions as the respective configurations of the base station 10 and the MTC terminal 20 may be produced. Further, storage media storing such computer programs may also be provided.

REFERENCE SIGNS LIST

10 Base station
12 MME
14 S-GW
20 MTC terminal
104, 204 Antenna
108, 208 Radio communication section
112 Scheduler
116 P-RNTI managing section
121 to 125 Paging cycle managing section
131 to 135, 231 to 234 Storage section
141 to 145 Paging control section
150 CRC circuit
221 to 224 Receiving cycle control section
240 Blind decoding section
250 CRC circuit
260 State detecting section

What is claimed is:

1. A radio communication device, comprising:
   circuitry configured to:
   communicate with a base station that transmits paging information that have different paging cycles;
   detect a state change of the radio communication device;
   switch autonomously, based on the detection of the state change, receiving cycles from a first receiving cycle to a second receiving cycle to receive a paging channel that includes the paging information,
   wherein, the paging channel is transmitted in both of the first receiving cycle and the second receiving cycle, based on a reception of first information that correspond to the detection of the state change; and
   receive second information related to the first receiving cycle and the second receiving cycle from the base station.

2. The radio communication device according to claim 1, wherein the circuitry is further configured to store the received second information related to the first receiving cycle and the second receiving cycle.

3. The radio communication device according to claim 1, wherein the circuitry is further configured to switch from the first receiving cycle to the second receiving cycle at a switching time in a disconnected state with the base station.

4. The radio communication device according to claim 1, wherein the circuitry is further configured to detect a movement of the radio communication device as the state change.

5. The radio communication device according to claim 1, wherein the circuitry is further configured to detect that the radio communication device has moved to a determined location as the state change.

6. The radio communication device according to claim 1, wherein the circuitry is further configured to detect a reduction in remaining power of the radio communication device as the state change.

7. The radio communication device according to claim 1, wherein the radio communication device includes a vending machine function configured for sale of a product, and
wherein the circuitry is further configured to detect at least one of a change in sales by the vending machine function or a reduction in a stock of the product as the state change.

8. A method for radio communication, comprising:
in a radio communication device:
communicating with a base station that transmits paging information that have different paging cycles;
detecting a state change of the radio communication device;
switching autonomously, based on the detection of the state change, receiving cycles from a first receiving cycle to a second receiving cycle to receive a paging channel that includes the paging information,
wherein, the paging channel is transmitted in both of the first receiving cycle and the second receiving cycle, based on a reception of first information that correspond to the detection of the state change; and
receiving second information related to the first receiving cycle and the second receiving cycle from the base station.

9. The method according to claim 8, further comprising storing the received second information related to the first receiving cycle and the second receiving cycle.

10. The method according to claim 8, wherein the first receiving cycle is switched to the second receiving cycle at a switching time in a disconnected state with the base station.

11. The method according to claim 8, further comprising detecting a movement of the radio communication device as the state change.

12. The method according to claim 8, further comprising detecting that the radio communication device has moved to a determined location as the state change.

13. The method according to claim 8, further comprising detecting a reduction in remaining power of the radio communication device as the state change.

14. The method according to claim 8, wherein the radio communication device includes a vending machine function configured for sale of a product, and
wherein a change in sales by the vending machine function or a reduction in a stock of the product is detected as the state change.

* * * * *